(12) United States Patent
Bassin et al.

(10) Patent No.: US 9,292,421 B2
(45) Date of Patent: *Mar. 22, 2016

(54) SYSTEM AND METHOD FOR RESOURCE MODELING AND SIMULATION IN TEST PLANNING

(71) Applicant: INTERNATIONAL BUSINESS MACHINES CORPORATION, Armonk, NY (US)

(72) Inventors: Kathryn A. Bassin, Harpursville, NY (US); Howard M. Hess, Winnetka, IL (US); Sheng Huang, Shanghai (CN); Steven M. Kagan, Burr Ridge, IL (US); Shao C. Li, Beijing (CN); Zhong J. Li, Beijing (CN); He H. Liu, Beijing (CN); Susan E. Smith, Talking Rock, GA (US); Hua F. Tan, Beijing (CN); Li Wang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,609

(22) Filed: Oct. 16, 2014

(65) Prior Publication Data

US 2015/0067636 A1   Mar. 5, 2015

Related U.S. Application Data

(63) Continuation of application No. 12/558,263, filed on Sep. 11, 2009, now Pat. No. 8,893,086.

(51) Int. Cl.
G06F 9/44   (2006.01)
G06F 11/36   (2006.01)
G06Q 10/06   (2012.01)
G06Q 10/10   (2012.01)
G06Q 30/02   (2012.01)

(52) U.S. Cl.
CPC .............. *G06F 11/3684* (2013.01); *G06F 8/70* (2013.01); *G06Q 10/06* (2013.01); *G06Q 10/067* (2013.01); *G06Q 10/103* (2013.01); *G06Q 30/0249* (2013.01)

(58) Field of Classification Search
CPC .................. G06F 11/3684; G06F 11/3688
USPC ......................................... 717/124, 134–135
See application file for complete search history.

(56) References Cited

U.S. PATENT DOCUMENTS 5,539,652 A   7/1996   Tegethoff
5,651,111 A   7/1997   McKeeman et al.
5,724,273 A   3/1998   Desgrousilliers et al.

(Continued)

OTHER PUBLICATIONS

Notice of Allowance dated Aug. 20, 2014 in related U.S. Appl. No. 13/923,581, 11 pp.

(Continued)

*Primary Examiner* — Duy Khuong Nguyen
(74) *Attorney, Agent, or Firm* — Matthew Chung; Andrew M. Calderon; Roberts Mlotkowski Safran & Cole, P.C.

(57) ABSTRACT

A method includes generating a test model based on at least one of test group dependencies and test group constraints and generating a resource base. the method includes generating a cost model and generating a resource allocation plan based on the test model, the resource base, and the cost model.

11 Claims, 22 Drawing Sheets

(56) References Cited

U.S. PATENT DOCUMENTS

| | | | |
|---|---|---|---|
| 5,854,924 A | 12/1998 | Rickel et al. | |
| 5,905,856 A | 5/1999 | Ottensooser | |
| 6,154,876 A | 11/2000 | Haley et al. | |
| 6,186,677 B1 | 2/2001 | Angel et al. | |
| 6,332,211 B1 | 12/2001 | Pavela | |
| 6,442,748 B1 | 8/2002 | Bowman-Amuah | |
| 6,456,506 B1 | 9/2002 | Lin | |
| 6,477,471 B1 | 11/2002 | Hedstrom et al. | |
| 6,519,763 B1 | 2/2003 | Kaufer et al. | |
| 6,546,506 B1 | 4/2003 | Lewis | |
| 6,601,017 B1 | 7/2003 | Kennedy et al. | |
| 6,601,233 B1 | 7/2003 | Underwood | |
| 6,725,399 B1 | 4/2004 | Bowman | |
| 6,766,473 B2 | 7/2004 | Nozuyama | |
| 6,862,696 B1 | 3/2005 | Voas et al. | |
| 6,889,167 B2 | 5/2005 | Curry | |
| 6,901,535 B2 | 5/2005 | Yamauchi et al. | |
| 6,988,055 B1 | 1/2006 | Rhea et al. | |
| 7,080,351 B1 | 7/2006 | Kirkpatrick et al. | |
| 7,200,775 B1 | 4/2007 | Rhea et al. | |
| 7,219,287 B1 | 5/2007 | Toutounchi et al. | |
| 7,231,549 B1 | 6/2007 | Rhea et al. | |
| 7,334,166 B1 | 2/2008 | Rhea et al. | |
| 7,451,009 B2 | 11/2008 | Grubb et al. | |
| 7,630,914 B2 | 12/2009 | Veeningen et al. | |
| 7,788,647 B2 | 8/2010 | Martin et al. | |
| 7,809,520 B2 | 10/2010 | Adachi | |
| 7,861,226 B1 | 12/2010 | Episkopos et al. | |
| 7,886,272 B1 | 2/2011 | Episkopos et al. | |
| 7,917,897 B2 | 3/2011 | Bassin et al. | |
| 7,984,304 B1 | 7/2011 | Waldspurger et al. | |
| 8,001,530 B2 | 8/2011 | Shitrit | |
| 8,191,044 B1 | 5/2012 | Berlik et al. | |
| 8,539,438 B2 | 9/2013 | Bassin et al. | |
| 8,578,341 B2 | 11/2013 | Bassin et al. | |
| 2001/0052108 A1 | 12/2001 | Bowman-Amuah | |
| 2002/0078401 A1 | 6/2002 | Fry | |
| 2002/0188414 A1 | 12/2002 | Nulman | |
| 2003/0018952 A1 | 1/2003 | Roetzheim | |
| 2003/0033191 A1 | 2/2003 | Davies et al. | |
| 2003/0058277 A1 | 3/2003 | Bowman-Amuah | |
| 2003/0070157 A1 | 4/2003 | Adams et al. | |
| 2003/0196190 A1 | 10/2003 | Ruffolo et al. | |
| 2004/0205727 A1 | 10/2004 | Sit et al. | |
| 2004/0225465 A1 | 11/2004 | Pramanick et al. | |
| 2004/0267814 A1 | 12/2004 | Ludwig et al. | |
| 2005/0021766 A1 | 1/2005 | McKeowen et al. | |
| 2005/0071807 A1 | 3/2005 | Yanavi | |
| 2005/0102654 A1 | 5/2005 | Henderson et al. | |
| 2005/0114828 A1 | 5/2005 | Dietrich et al. | |
| 2005/0144529 A1 | 6/2005 | Gotz et al. | |
| 2005/0209866 A1 | 9/2005 | Veeningen et al. | |
| 2005/0283751 A1 | 12/2005 | Bassin et al. | |
| 2006/0047617 A1 | 3/2006 | Bacioiu et al. | |
| 2006/0123389 A1 | 6/2006 | Kolawa et al. | |
| 2006/0248504 A1 | 11/2006 | Hughes | |
| 2006/0251073 A1 | 11/2006 | Lepe et al. | |
| 2006/0265188 A1 | 11/2006 | French et al. | |
| 2007/0028220 A1 | 2/2007 | Miller et al. | |
| 2007/0100712 A1 | 5/2007 | Kilpatrick et al. | |
| 2007/0101215 A1 | 5/2007 | Holmqvist | |
| 2007/0112879 A1 | 5/2007 | Sengupta | |
| 2007/0162257 A1 | 7/2007 | Kostyk et al. | |
| 2007/0168744 A1 | 7/2007 | Pal et al. | |
| 2007/0174023 A1 | 7/2007 | Bassin et al. | |
| 2007/0233414 A1 | 10/2007 | Kratschmer et al. | |
| 2007/0234294 A1 | 10/2007 | Gooding | |
| 2007/0283325 A1 | 12/2007 | Kumar | |
| 2007/0283417 A1 | 12/2007 | Smolen et al. | |
| 2007/0300204 A1 | 12/2007 | Andreev et al. | |
| 2008/0010543 A1 | 1/2008 | Yamamoto et al. | |
| 2008/0016415 A1 | 1/2008 | Ide | |
| 2008/0022167 A1 | 1/2008 | Chung et al. | |
| 2008/0052707 A1 | 2/2008 | Wassel et al. | |
| 2008/0072328 A1 | 3/2008 | Walia et al. | |
| 2008/0092108 A1 | 4/2008 | Corral | |
| 2008/0092120 A1 | 4/2008 | Udupa et al. | |
| 2008/0104096 A1 | 5/2008 | Doval et al. | |
| 2008/0162995 A1 | 7/2008 | Browne et al. | |
| 2008/0178145 A1 | 7/2008 | Lindley | |
| 2008/0201611 A1 | 8/2008 | Bassin et al. | |
| 2008/0201612 A1 | 8/2008 | Bassin et al. | |
| 2008/0255693 A1 | 10/2008 | Chaar et al. | |
| 2009/0070734 A1 | 3/2009 | Dixon et al. | |
| 2009/0089755 A1 | 4/2009 | Johnson et al. | |
| 2009/0319317 A1 | 12/2009 | Colussi et al. | |
| 2010/0005444 A1 | 1/2010 | McPeak | |
| 2010/0017787 A1 | 1/2010 | Bellucci et al. | |
| 2010/0145929 A1 | 6/2010 | Burger et al. | |
| 2010/0211957 A1 | 8/2010 | Lotlikar et al. | |
| 2010/0275263 A1 | 10/2010 | Bennett et al. | |
| 2010/0319004 A1* | 12/2010 | Hudson et al. | 719/313 |
| 2010/0332274 A1 | 12/2010 | Cox et al. | |
| 2011/0296371 A1 | 12/2011 | Marella | |
| 2012/0017195 A1 | 1/2012 | Kaulgud et al. | |
| 2012/0053986 A1 | 3/2012 | Cardno et al. | |
| 2012/0144374 A1 | 6/2012 | Gallagher et al. | |

OTHER PUBLICATIONS

Office Action dated Oct. 10, 2014 in related U.S. Appl. No. 12/558,324, 13 pp.

Final Office Action dated Nov. Nov. 20, 2014 in related U.S. Appl. No. 14/041,440, 7 pp.

Office Action dated Jan. 9, 2015 in related U.S. Appl. No. 14/510,296 12, pages.

Notice of Allowance dated Jan. 30, 2015 in related U.S. Appl. No. 14/041,440, 7 pp.

Final Office Action dated May 12, 2015 for related U.S. Appl. No. 12/558,324, 6 pages.

Office Action dated Jun. 12, 2015 for related U.S. Appl. No. 13/930,870 , 16 pages.

Notice of Allowance dated Jun. 18, 2015 for related U.S. Appl. No. 14/510,296, 11 pages.

Chan et al., "A Tool to Support Perspective Based Approach to Software Code Inspection", Proceedings of the 2005 Australian Software Engineering Conference, IEEE, 2005, 8 pages.

Lsu (Estimating Project Costs & Time, Louisiana State University, dated Jul. 25, 2004; retrieved online Oct. 18, 2012; URL: http://laspace. lsu.edu/aces/Lectu res/Managemeni/Lecture%205%20-%20Estimating%20Costs. ppt).

Ulrich, "test case dependency processing in robot framework", Feb. 16, 2009, Google, https://groups.google.com/forum/?fromgroups#!topic/robotframework-users/twcycBNLXI4, p. 1-4.

McGarry, J. et al., "Practical Software Measurement: A Guide to Objective Program Insight", http://pdf.aminer.org/000/361/576/practical_softvvare_measurement.pdf, Naval Undersea Warfare Center, Version 2.1, Part 1 to Part 4, 1996, 299 pages.

Jonsson, G., "A Case Study into the Effects of Software Process Improvement on Product Quality", Jun. 2004, Master's Tesis in Computer Science—University of Iceland, 93 pages.

Hurlbut, "Managing Domain Architecture Evolution Through Adaptive Use Case and Business Rule Models", 1997, pp. 1-42.

Boehm, B., "Software Engineering Economics", IEEE Transactions on Software Engineering, vol. SE-19, No. 1, Jan. 1984, pp. 4-21.

Basili, V. et al., "Comparing the Effectiveness of Software Testing Strategies", IEEE Transactions on Software Engineering, vol. SE-13, No. 12, Dec. 1987, pp. 1278-1296.

Holden, I. et al., "Imporving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from http://www2006.ta icpart.org/presentations/session5/3 .pdf, pp. 1-25.

Ponaraseri, S. et al., "Using the Planning Game for Test Case Prioritization", retrieved from http:selab.fbk.eu/tonella/papers/issre2008 .pdf, pp. 1-10.

(56) References Cited

OTHER PUBLICATIONS

Tonella, P., "Publication List", 2012, retrieved from http://selab.fbk.eu/tonella/papersbyyear.html, 15 pages.
Ambler, S., "Choosing the Right Software Method for the Job", http://web.archive.org/web/20090219074845/http:// agiledata.org/essays/differentStrategies.html, retrieved Jun. 7, 2012, pp. 1-14.
Unknown, "ASTQB—ISTQB Software Testing Certification : ISTQB Syllabi", http://web.archive.orb/web/20090423053623/http://www.astqb.org/educational-resources/syllabi-management5.php, retrieved Jun. 7, 2012, pp. 1-12.
Kwinkelenberg, "Smartesting for Dummies", Oct. 14, 2008, Wiley, p. 1-36.
Lazic, "Cost Effective Software Test Metrics", Aug. 5, 2008, WSEAS Transactions on Computers, p. 599-619.
Hou, "Optimal Release Times for Software Systems with Scheduled Delivery Time Based on the HGDM", 1997, IEEE, p. 216-221.
Office Action dated Oct. 6, 2015 for related U.S. Appl. No. 14/160,954, 10 pp.
Office Action dated Oct. 23, 2015 for related U.S. Appl. No. 14/844,422, 9 pages.
Notice of Allowance dated Nov. 2, 2015 for related U.S. Appl. No. 13/930,870, 23 pages.
Office Action dated Nov. 5, 2015 for related U.S. Appl. No. 12/558,324 7 pp.

* cited by examiner

USA CHINA INDIA

ORGANIZATION TREE
▫ USA
　* CLIENT
　* IBM
　* USA-IBM

DOUBLE-CLICK ORGANIZATION TREE ITEM TO DEFINE RESOURCE

USA-IBM  810  850
| ORGANIZATION INFO | TESTER |

| ATTRIBUTE NAME | 820 VALUE |
| --- | --- |
| AVERAGE DAILY RATE | 800  USD($) |
| STAFF NUMBER  830 | 7  MEMBER |
| COMPETENCY | ☑ HIGH LEVEL DESIGN REVIEW<br>☑ CODE INSPECTION — 840<br>☐ UNIT TEST<br>☐ FUNCTION TEST<br>☐ SYSTEM TEST |

✓ SAVE CHANGE    ✗ CLOSE

TESTER ATTRIBUTE
• DAILY RATE
• KNOWLEDGE
• LANGUAGE
• DDE BY TRIGGER
• AVAILABLE TIME

TEST ENVIRONMENT
• CPU
• MACHINE
• MEMORY

BUSINESS COST CONFIGURATION

| COST TYPE PER DEFECT | DEFECT SEVERITY | | | | |
|---|---|---|---|---|---|
| | 1 [10%] | 2 [25%] | 3 [35%] | 4 [15%] | 5 [15%] |
| BUSINESS PROFIT LOSS | $500 | $100 | $50 | $20 | $5 |
| CUSTOMER LOSS | $50 | $20 | $15 | $30 | $3 |
| PENALTY PAYMENT | $300 | $200 | $100 | $50 | $2 |
| OPERATION IMPACT | $300 | $200 | $100 | $50 | $3 |
| OTHERS | $300 | $200 | $100 | $50 | $3 |

1110, 1120, 1150

BUSINESS COST

| RISK LEVEL | DEFECTS NUM | TOTAL BIZ COST |
|---|---|---|
| HIGH RISK | 804 | $782,533.19 |
| MEDIUM RISK | 804 | $391,266.59 |
| LOW RISK | 804 | $195,633.30 |
| | TOTAL: $1,369,433.00 | |

SYSTEM AND METHOD FOR RESOURCE MODELING AND SIMULATION IN TEST PLANNING

FIELD OF THE INVENTION

The present invention generally relates to project test planning, and more particularly, to a method and system for resource modeling and simulation in test planning.

BACKGROUND

While software systems continue to grow in size and complexity, business demands continue to require shorter development cycles. This has led some software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for companies developing software and other products.

To improve product quality, many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Testing and identifying problem areas related to software development may occur at different points or stages in a software development lifecycle. For example, a general software development lifecycle includes a high level requirements/design review, a detailed requirements/design review, code inspection, unit test, system test, system integration test, potentially a performance test, and typically, a user acceptance test. Moreover, as the software development lifecycle proceeds from high level requirements/design review to user acceptance test, costs for detecting and remedying software defects generally increases.

In an effort to rein in cost and time overruns, organizations sometimes develop one or more test plans that consolidate ideas on how to allocate effort for a test project. Test plans may include efforts regarding how to design testing activities and focus for the test project. Planning for a test project (e.g., testing project planning, test project planning, project test planning) normally contains two key levels of planning: macro planning and micro planning.

Macro planning is typically achieved using a top-down approach. Macro planning is most effectively performed in the early stages of a project, and is usually accomplished by comparing the current project to the most appropriate available historical project. The result of macro planning is a high level plan for how to allocate effort and how to design the testing activities and focus. The challenges to macro planning frequently include the ability to find a sufficiently similar historical project on which to base planning decisions for the current test project.

Micro planning is typically achieved using a bottom-up approach, and generally includes very detailed plans for every test to be performed after the Unit Test. For example, a micro plan may define how to run a particular test, including the date(s) for the test, the personnel involved with the test, what to do with the results of the test, etc. As any project moves forward in time, more detailed information (e.g., requirements) become available. Very mature organizations might be able to effectively leverage micro planning by looking at the different characteristics of requirements (e.g., risk, size, complexity associated with each). When an organization can do this, it is able to produce a more granular and precise estimation of the effort required, as well as the specific optimum test focus of each defined activity in the macro plan. However, given the pace of schedules, it is increasingly challenging for projects to produce accurate, timely, and cost effective micro plans.

Although conventional scheduling software is capable of supporting resource allocation efforts on any given project, the task of optimally staffing a test execution project is a more complex problem to solve due to the unknown impact of blocking defects. If test resource allocation is not carefully constructed and maintained, a test project can very quickly become mired in a situation where multiple resources may be delayed or blocked entirely from making progress for unacceptably long periods of time during the test execution window when test dependencies are not adequately identified and analyzed. In these cases, test costs relative to benefits received are significantly higher.

Despite this often severe impact to cost and schedule, conventional tools do not provide the functionality to adequately address these issues. As a result, alternative resource allocation planning for testing typically is not performed since it is largely a manual task and too labor intensive to be delivered in a timely way for projects to benefit from the information. As a result, many projects simply opt to execute against a resource allocation plan that is significantly more costly and less efficient than what could have been achieved because they were unaware a better alternative existed.

Accordingly, there exists a need in the art to overcome the deficiencies and limitations described herein above.

SUMMARY

In a first aspect of the invention, there is a method implemented in a computer infrastructure having computer executable code tangibly embodied on a computer readable storage medium having programming instructions operable to: generate a test model based on at least one of test group dependencies and test group constraints; generate a resource base; generate a cost model; and generate a resource allocation plan based on the test model, the resource base, and the cost model.

In another aspect of the invention, a system comprising: a test planning optimization workbench including a processor, a memory, a test modeling module operable to generate a test model from test cases and test case dependencies, a cost module operable to generate a cost model based on at least one of defect-fix cost, business cost, and delay cost, and a resource modeling and simulation module operable to generate a resource plan based on the test model and the cost model.

In an additional aspect of the invention, there is a computer program product comprising a computer usable storage medium having readable program code embodied in the storage medium. When executed on a computing device, the program code causes the computing device to: generate a test model based on test cases and test case dependencies; generate a resource base defining attributes associated with testers; generate a cost model comprising at least one constraint; and generate a resource plan based on the test model, the resource base, and the cost model.

In a further aspect of the invention, there is a computer system for creating a dynamically adjustable resource model for test planning. The computer system comprises a processor, a computer readable memory, and a computer readable storage media. The computer system also comprises: first program instructions to generate a test model based on test cases and test case dependencies; second program instructions to generate a resource base defining attributes associated with testers; third program instructions to generate a cost model comprising at least one constraint; and fourth program instructions to generate a resource plan based on the test model, the resource base, and the cost model. The first, second, third, and fourth program instructions are stored on the computer readable storage media for execution by the processor via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 8 illustrates an exemplary user interface and underlying functionality in accordance with aspects of the invention;

FIGS. 10-12 illustrate exemplary user interfaces and underlying functionality in accordance with aspects of the invention;

DETAILED DESCRIPTION

Figure 1:
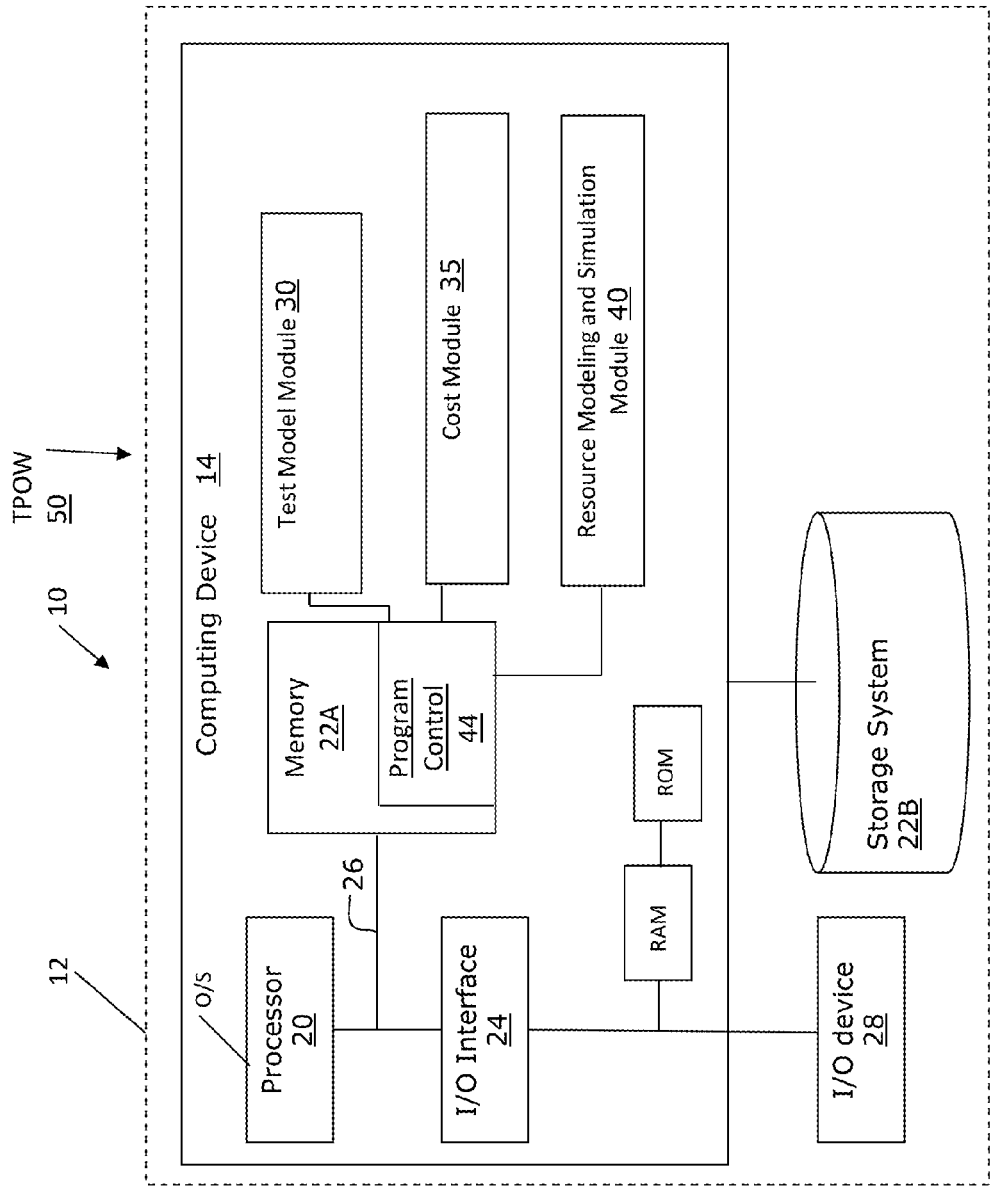
FIG. 1 shows an illustrative environment for implementing the steps in accordance with aspects of the invention.

The present invention generally relates to project test planning, and more particularly, to a method and system for resource modeling and simulation in test planning. In accordance with aspects of the invention, scheduling dependencies between individual test cases of a project are defined as are attributes of resources for performing the test cases. Additionally, cost rules and project constraints are defined. In embodiments, the test case dependencies, resource attributes, cost rules, and constraints are utilized by a planning tool to generate an optimized resource allocation plan that minimizes the total cost while maintaining the test case dependencies, allocating the defined resources to the test cases, and adhering to the constraints. In further embodiments, the tool is designed for dynamic updating so that as project conditions change, the resource allocation scenarios adapt accordingly. In this manner, implementations of the invention provide a standardized resource allocation analysis in a highly automated and dynamically updatable way, which makes resource allocation analysis cost effective to perform.

Implementations of the invention address the aforementioned problems associated with conventional tools by providing a model to project different resource allocation plan scenarios in a way that incorporates and reflects multiple perspectives and goals, and can be dynamically updated if and/or when project assumptions change over time. Embodiments of the invention may include: acquiring test group dependency and constraints to construct a test model; inputting and annotating resource information, including tester and test environment resource information to construct a resource base; inputting warning threshold, expected escape defects, business cost configuration, project delay cost configuration, and defect fix cost configuration for the optimized total cost model input; leveraging the optimized total cost model to generate resource modeling and simulation; adjusting schedule constraints for expected resource modeling when the any of the factors such as total cost, time duration, etc., are not satisfied; and providing auto schedule delay warning and on the fly rescheduling in case any emergent factors move the schedule over the delay warning threshold.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a test planning optimization workbench (TPOW) 50.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc. In embodiments, test dependency, annotation, planning and other information may be stored in storage system 22B or another storage system, which may be, for example, a database.

In general, the processor 20 executes computer program code (e.g., program control 44), which can be stored in the memory 22A and/or storage system 22B. Moreover, in accordance with aspects of the invention, a program control 44 controls a test model module 30, cost module 35, and resource modeling and simulation module 40, described in greater detail herein. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the computing device 14 includes test model module 30, cost module 35, and resource modeling and simulation module 40. In accordance with aspects of the invention, the test model module 30 provides functionality to acquire test case dependencies and constraints and generate a test model including a test dependency graph and critical path. In embodiments, the test model module 30 may also provide functionality for inputting and annotating resource information, and generating a resource model. In accordance with further aspects of the invention, the cost module 35 provides functionality to input cost rules and project constraints, and generate an optimized total cost model. In accordance with aspects of the invention, the resource modeling and simulation module 40 provides functionality to generate a resource allocation plan based on the test model, resource model, and optimized cost model.

The test model module 30, cost module 35, and resource modeling and simulation module 40 may be implemented as one or more program code modules in the program control, and may be stored in memory as separate or combined modules. For example, the test model module 30, cost module 35, and resource modeling and simulation module 40 may comprise and/or utilize at least one of programmed logic, rules, algorithms, and probability tables in performing the processes described herein.

Structured DRM and ODC

In accordance with aspects of the invention, the TPOW 50 generates defect projections that are used in macro and micro planning by leveraging aspects of ODC (Orthogonal Defect Classification) and DRM (Defect Reduction Method). More specifically, in embodiments, the TPOW 50 utilizes the "activity" and "trigger" attributes of the ODC/DRM schema, which are as described in commonly assigned U.S. Pat. Nos. 8,539,438 and 8,578,341, the contents of which are hereby expressly incorporated by reference in their entirety.

Figure 2:
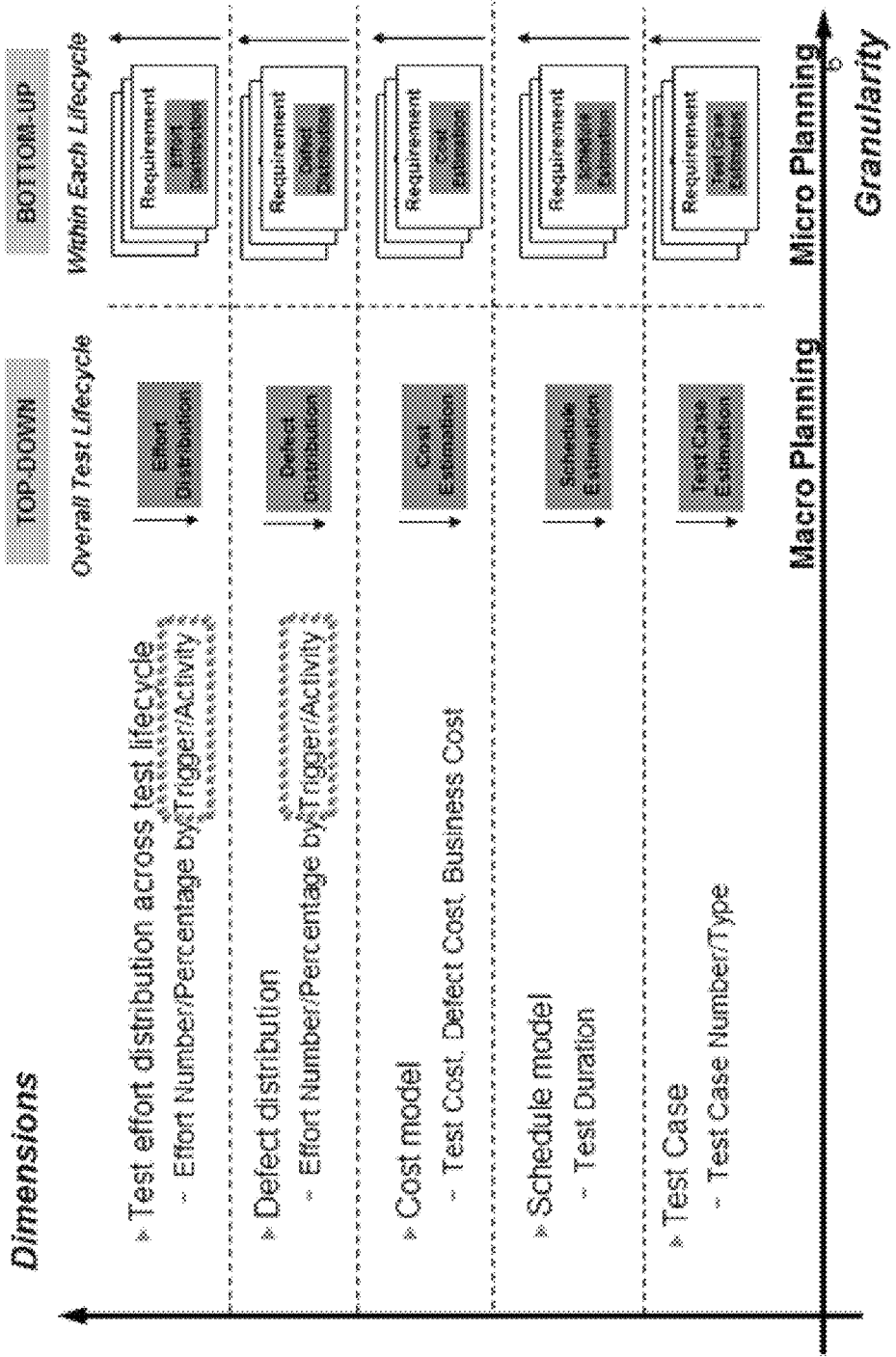
FIG. 2 shows an high level overview of a model in accordance with aspects of the invention.

In accordance with further aspects of the invention, the TPOW 50 is based on the "structured DRM model" 300 shown in FIG. 2. In embodiments, the TPOW 50 uses the activity and trigger attributes to estimate test effort and project defect distributions across the entire project life cycle of defect removal activities. As depicted by reference number 305 in FIG. 2, the ODC/DRM activity and trigger attributes are leveraged at a high level with the structured DRM model 300.

In embodiments, the structured DRM model 300 comprises the following dimensions: test effort distribution across the test life cycle 310; defect distribution across the life cycle 320; cost modeling 330; schedule modeling 340; and test case modeling 350. However, the invention is not limited to these dimensions, and any suitable dimensions may be used within the scope of the invention.

In accordance with aspects of the invention, test effort distribution 310 and defect distribution 320 across the life cycle in the structured DRM model 300 can be specified directly or specified as a percentage allocation by trigger/activity of overall test effort and defect counts. Effort may be calculated in PD (person days), or any other suitable measure.

In embodiments, cost modeling 330 across the life cycle in the structured DRM model 300 is measured in Test Cost, Defect Cost, and Business Cost. Test cost may represent, for example, the cost induced by defect removal activities, including but not limited to: understanding requirements, test assessment and planning, test design, test execution, defect reporting, retest, test tool acquirement, license costs, etc. Defect cost may represent, for example, the cost induced by defect diagnosis and resolution, and usually comes from a developer or other defect resolution team. Business cost may represent, for example, the cost induced by business impact when defects show up in production.

In further embodiments, schedule modeling 340 in the structured DRM model 300 applies scheduling calculations around test duration to derive planning dates. Test Case modeling 350 in the structured DRM model 300 applies standard test case number and/or type calculations to provide test coverage planning information. Implementations of the present invention may be used with the schedule modeling 340 in both macro planning and micro planning.

In accordance with aspects of the invention, the structured DRM model 300 establishes a relationship between macro planning 360 and micro planning 370 based upon the dimensions 310, 320, 330, 340, and 350. Moreover, the structured DRM model 300 utilizes defect discovery information, which is more accurate than conventional models because it is dependent on data that is available for every defect that can occur, e.g., all defects are included in the structured DRM model 300.

Processes

Figure 3:
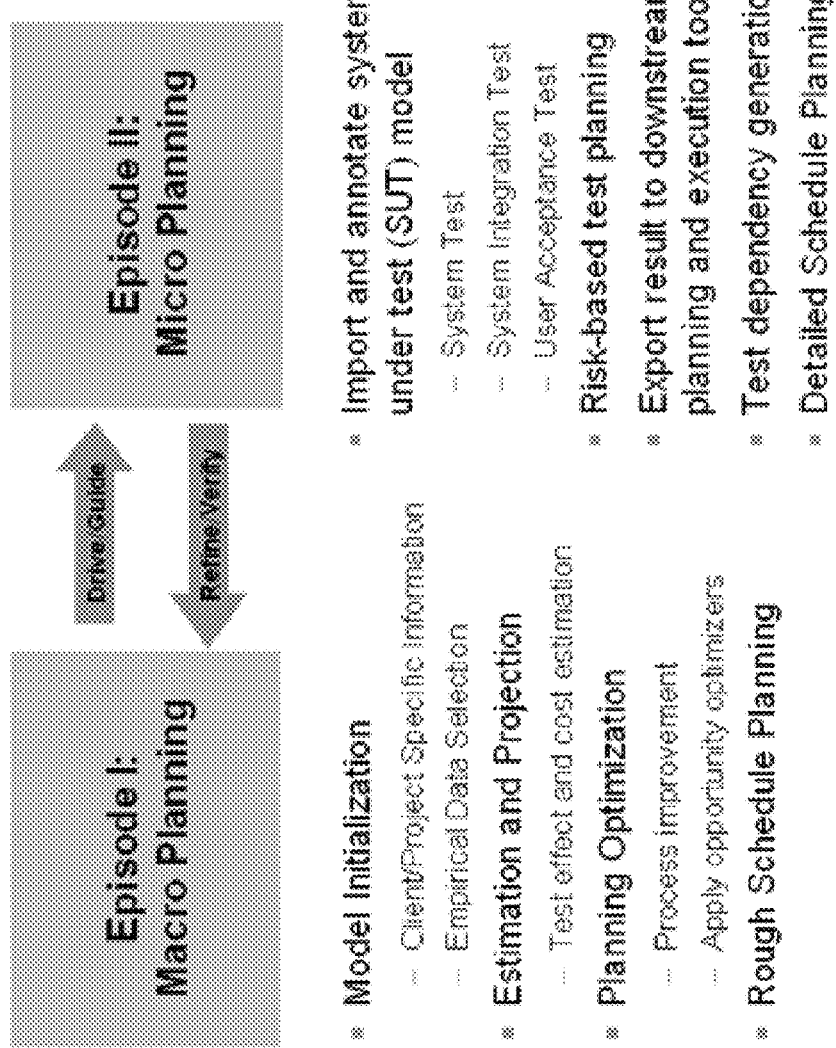
FIG. 3 illustrates a high level process flow in accordance with aspects of the invention.

FIG. 3 illustrates a high level flow diagram 380 in accordance with aspects of the invention. The steps of FIG. 3, and all other flow diagrams herein, may be implemented in the environment of FIG. 1, for example. The flow diagrams may equally represent a high-level block diagram or a swim-lane diagram of the invention. The flowchart and/or block diagram in FIG. 3, and of other figures herein, illustrates the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As shown in FIG. 3, the flow 380 includes a step 385 comprising macro planning. In embodiments, the macro planning in the step 385 may be performed using the TPOW 50, as described in U.S. Pat. No. 8,539,438. In embodiments, the macro planning may include, but is not limited to: model initialization (e.g., client/project specific information, and empirical data selection); estimation and projection (e.g., test effect and cost estimation); planning optimization (e.g., process improvement and applying opportunity optimizers); and high level (e.g., rough) schedule planning.

Flow 380 also includes a step 390 comprising micro planning. In embodiments, the micro planning in the step 390 may be performed using the TPOW 50, and in particular the micro planning module 35, as described in U.S. Pat. No. 8,539,438. In embodiments, the micro planning may include, but is not limited to: importing and annotating the system under test (SUT) model (e.g., the System Test, System Integration Test, and User Acceptance Test); performing risk-based planning; exporting results to a downstream test planning and execution tool; defining use cases and test cases; generating test dependencies; and performing detailed schedule planning. Implementations of the present invention may be used to perform schedule planning in step 380 (e.g., macro planning) and/or step 390 (e.g., micro planning).

Resource Modeling and Simulation

Figure 4:
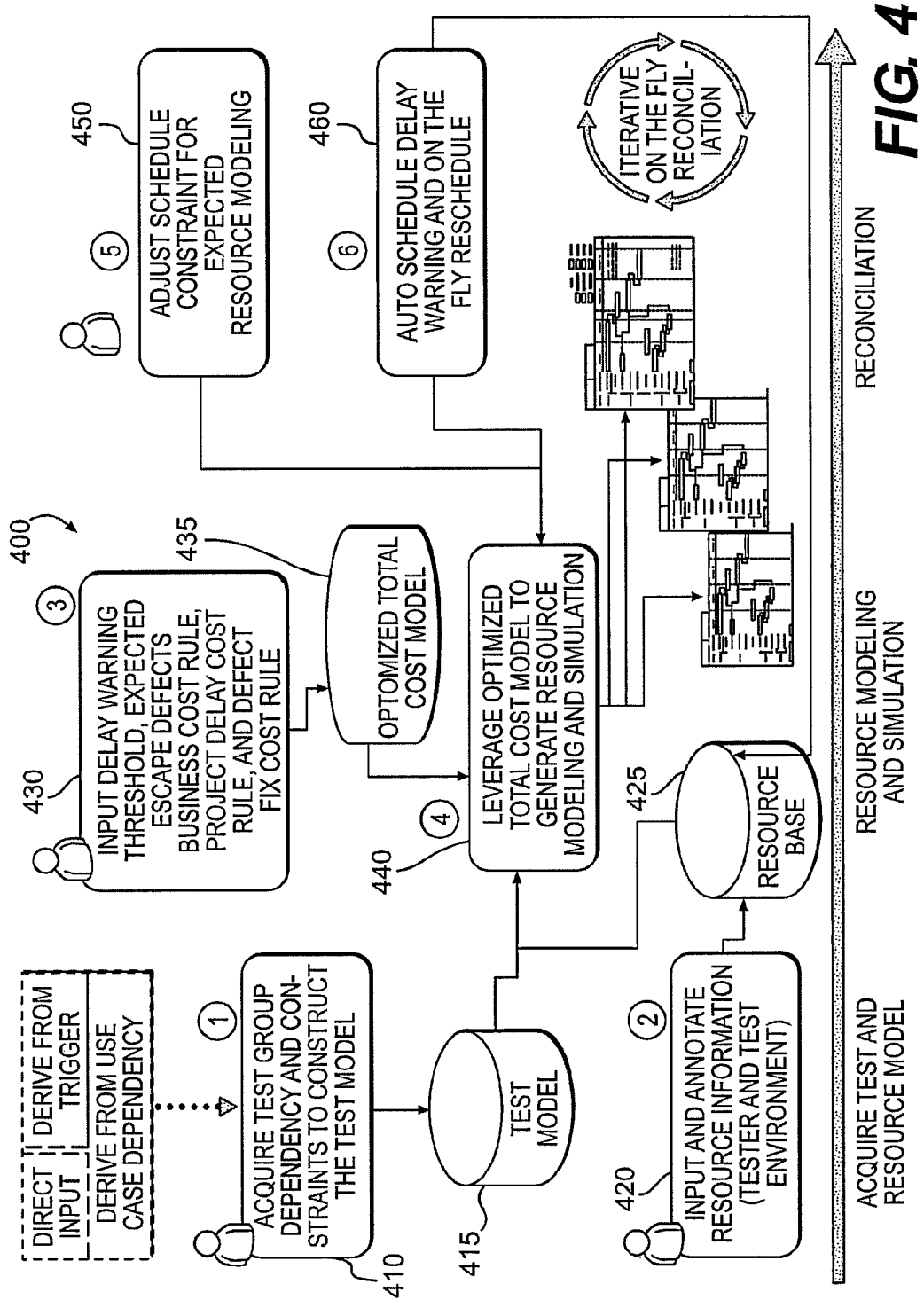
FIG. 4 illustrates a flow diagram associated with resource modeling and simulation in accordance with aspects of the invention.

FIG. 4 illustrates a high level flow 400 associated with resource modeling and simulation in accordance with aspects of the invention. The steps of FIG. 4 may be implemented in the environment of FIG. 1. For example, the processes described in FIG. 4 may be performed using the TPOW 50, and in particular the test model module 30, cost module 35, and resource modeling and simulation module 40, as described with respect to FIG. 1.

At step 410, test group dependencies and constraints are acquired by the TPOW 50. In embodiments, the test group dependencies and constraints are used by the test model module 30 in constructing a test model. In embodiments, the TPOW 50 acquires the test group dependencies and constraints from at least one of: manual user input, e.g., via a user interface implemented with the I/O device 28 described with respect to FIG. 1; automatic extraction by the test model module 30 from previously defined use cases dependencies, e.g., stored in storage system 22B described with respect to FIG. 1; and, automatic derivation by the test model module 30 from applicable ODC/DRM triggers, e.g., based on pre-defined logic and rules programmed into the TPOW 50 and stored in storage system 22B. In embodiments, step 410 also includes the test model module 30 constructing the test model 415, which may be stored in storage system 22B.

At step 420, resource information is input and/or annotated. In embodiments, the resource information is manually input and/or annotated by a user. The manual input and/or annotation of step 420, as well as all other instances of manual input described herein, may be performed by a user via a user interface implemented with the I/O device 28 described with respect to FIG. 1. In accordance with aspects of the invention, the resource information may include, but is not limited to: identity of a tester (e.g., person, resource, etc.); attributes associated with a tester (e.g., daily rate, knowledge/skills, language(s), available time, defect discovery efficiency, etc.); and, test environment definition (e.g., available CPU time, machinery, memory, etc.). In embodiments, resource information associated with step 420 may be stored in a resource base 425, which may be implemented in storage system 22B described with respect to FIG. 1. Moreover, any data that is input into the TPOW 50, as well as any data structures that are generated by the TPOW 50 in the processes described herein, may be stored in the storage system, 22B.

At step 430, data for defining and constructing an optimized total cost model is manually input by a user into the TPOW 50. In accordance with aspects of the invention, the data for defining and constructing an optimized total cost model may include, but is not limited to: one or more warning thresholds, expected escape defects, one ore more business cost configurations, one or more project delay cost configurations, and one or more defect fix cost configurations. In embodiments, the data associated with step 430 may be stored in a resource base 425, which may be implemented in storage system 22B described with respect to FIG. 1. In further embodiments, the cost module 35 (described with respect to FIG. 1) generates an optimized total cost model 435 using the data input at step 430.

Still referring to FIG. 4, at step 440, the resource modeling and simulation module 40 generates a resource model and simulation (e.g., a resource allocation plan) based on the test model 415, resource base 425, and the optimized total cost model 435. In embodiments, the generated resource model and simulation includes a micro plan which can be visualized (e.g., displayed) with a simulator via the TPOW 50. The processes performed by the resource modeling and simulation module 40 in generating the resource model are described in greater detail herein.

At step 450, at least one schedule constraint may be adjusted for expected resource modeling. In embodiments, step 450 includes a user manually adjusting an input parameter (e.g., a schedule constraint) of an existing resource model, and the resource modeling and simulation module 40 generating a new resource model based on the adjustment of the input parameter. In embodiments, the adjustment associated with step 430 is manually input by a user via a user interface implemented with the I/O device 28 described with respect to FIG. 1. In further embodiments, the new resource model is generated by the resource modeling and simulation module 40 in a manner similar to that described with respect to step 440, described in further detail herein.

At step 460, the resource modeling and simulation module 40 sends a warning to a user when the project schedule (e.g., from the resource model at step 440) exceeds an established threshold (e.g., defined in step 430). In embodiments, the warning includes, but is not limited to, an email and/or pop-up message from the TPOW 50 prompting the user to take action to address the delayed schedule. In further embodiments, step 460 also comprises a reschedule process that includes: receiving a manual resource adjustment from the user (e.g., an update to the resource base 425), and generating a new resource model and micro plan based on the adjustment from the user (e.g., similar to step 440).

The steps of FIG. 4 are further described herein with respect to FIGS. 5-20, which show exemplary user interfaces, flow diagrams, and underlying functionality of an exemplary implementation of a TPOW 50 in accordance with aspects of the invention. It is to be understood that the invention is not limited by the user interfaces and flow diagrams shown in FIGS. 5-20, and that the invention may be implemented in other manners not depicted in FIGS. 5-20.

Figure 5:
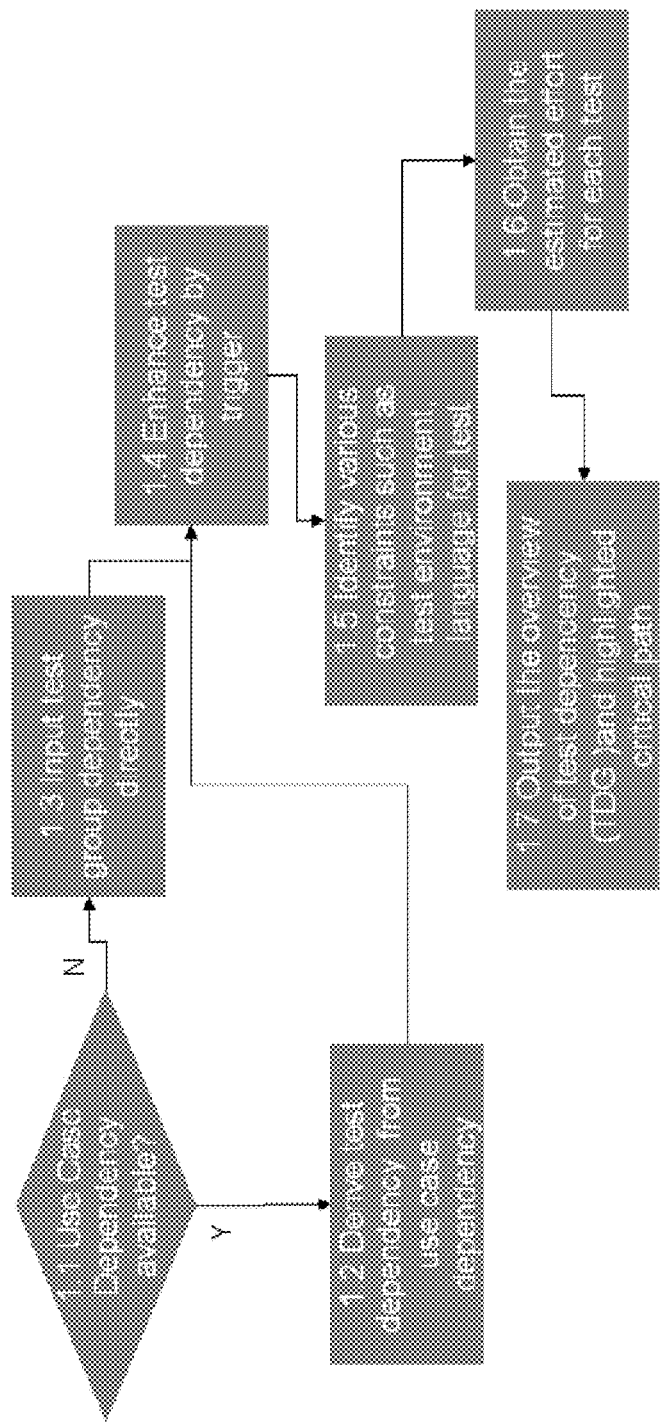
FIG. 5 depicts a flow diagram illustrating an exemplary process in accordance with aspects of the invention.

FIG. 5 shows a flow diagram 500 depicting steps of a process in accordance with aspects of the invention. The steps of the flow diagram 500 may be performed in association with step 410, described with respect to FIG. 4, in which test group dependencies and constraints are acquired by the TPOW 50. At step 510, the test model module 30 determines whether use case dependency information is available. In embodiments, a user may have previously defined one or more use case dependencies when generating a micro plan, such as described in U.S. Pat. No. 8,539,438. Pre-defined use case dependencies may be stored in and available from the storage system 22B. Additionally or alternatively the dependency relationship of use cases can be imported into TPOW from other analysis or planning tools. In embodiments, the test model module 30 is programmed to determine if any such use case dependencies exist in the TPOW 50 by examining stored and/or imported use case data. If use case dependencies do exist, then the process proceeds to step 520; if not, then the process proceeds to step 530.

At step 520, the test model module 30 derives test dependencies from the use case dependencies. In embodiments, test cases are defined in a micro plan as actual tasks that are done in association with a particular use case, and as such are linked to a particular use case. In embodiments, the test model module 30 is programmed to determine test case dependencies from the traceability between test cases and use cases.

When use case dependencies are not available at step 510, the process proceeds to step 530 where the test model module 30 prompts the user to manually input dependencies for test cases that are imported and/or generated by the TPOW (e.g., during micro planning). The user may manually input data related to test case dependencies via a user interface implemented in I/O device 28 described with respect to FIG. 1.

At step 540, the test dependencies from steps 520 or 530 are enhanced with trigger information. In embodiments, the test model module 30 identifies which trigger (e.g., ODC/DRM trigger) each test case is associated with and associates that trigger with any test dependencies related to that test case. The relationship of test cases to triggers is defined in the micro plan, and is stored in the TPOW 50. By adding trigger associations to test case dependencies, the test can be optimized to the resources available with higher corresponding defect discovery efficiency (DDE) during resource assignment.

At step 550, the user manually inputs data that identifies each test with various constraints such as, for example, test environment, language, knowledge, etc. The user may manually input data related to test case dependencies via a user interface implemented in I/O device 28 described with respect to FIG. 1. In embodiments, these test constraints are used to limit the scope of a candidate tester. It is to be understood that the invention is not limited to these exemplary constraints, and that any suitable constraints can be used within the scope of the invention.

At step 560, the test model module 30 determines a test estimated effort for each test by leveraging knowledge of best practices and/or an applicable reference project. In embodiments, the test model module 30 determines the test estimate effort using pre-defined rules, logic, and probability tables, which may be based on analysis and/or data-mining of historic data from past test projects and ODC/DRM defect analysis, and which may be programmed into the TPOW 50 (e.g., stored in the storage system 22B of FIG. 1). Additionally or alternatively, the user may annotate the estimated effort via manual input (e.g., via I/O device 28).

At step 570, the test model module 30 generates a test dependency graph and critical path based on the test attributes and test dependency relationships by leveraging the test model. In embodiments, the test model module 30 is programmed with logic for generating dependency graphs, which is known such that further explanation is not believed necessary. In embodiments, the test dependency graph is saved as the test model 415, described with respect to FIG. 4.

In accordance with aspects of the invention, the test dependency graph (TDG) is defined by TDG=(V.E), where "v" indicates a set of test cases (t) which can be parallelized by testers, and "eij" is the edge vi→vj, indicating that vj depends on vi, where the length of eij represents the time cost of the test vi. In further embodiments, the TDG is a partial graph, where a partial graph is defined as a data structure R, in which if (a,b)∈R and (b,c)∈R, then (a,c)∈R. In additional embodiments, the matrix is person day (PD), and v0,vend are two virtual nodes indicating the start node and end node, respectively.

Figure 6A:
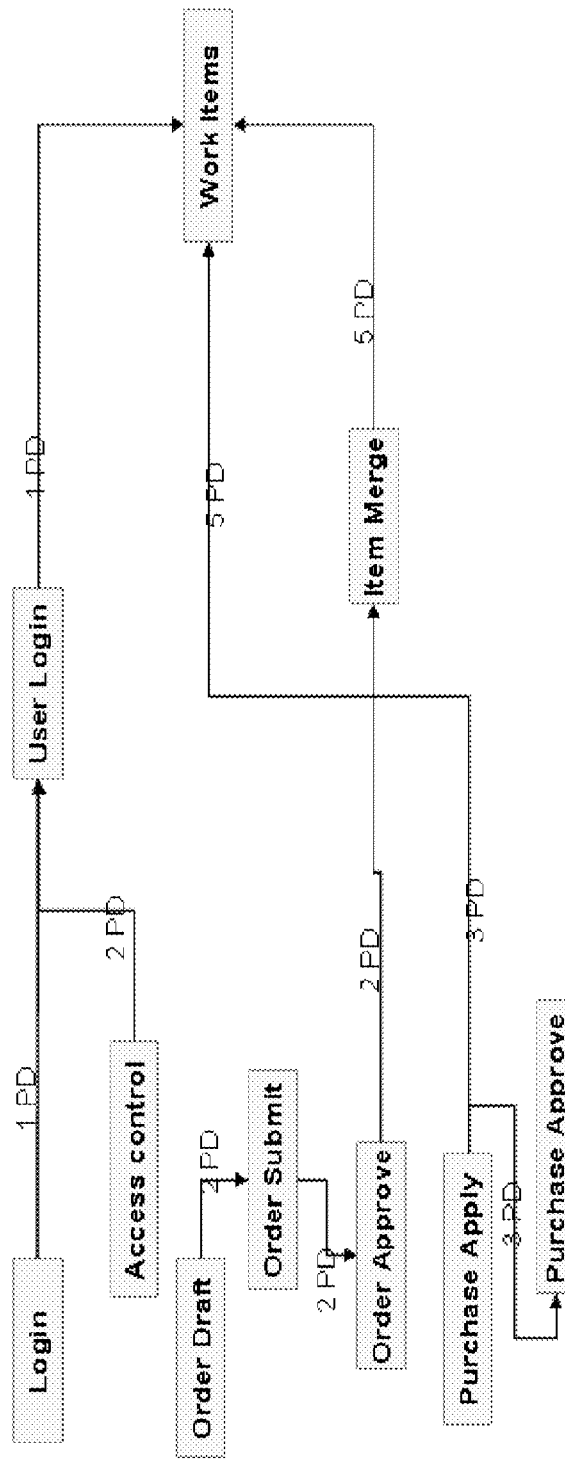
FIG. 6A depicts an exemplary test dependency graph in accordance with aspects of the invention.

FIG. 6A depicts an exemplary test dependency graph in accordance with aspects of the invention. In embodiments, each node, e.g., box 601, represents a test case or set of test cases, while each line between nodes, e.g., arrow 602, indicates a partial relation between the nodes. Moreover, a value over a line, e.g., value 603, indicates the effort (e.g., expressed in person days) needed to run the test cases. For example, the line from "Order Draft" to "Order Submit" indicates that "Order Draft" must be completed before "Order Submit" can be executed, and that it is estimated to take two PD (person days) to complete "Order Draft".

In accordance with further aspects of the invention, a test case is represented by "t" and may be a triple in which t=(av, et, trigger, ev, esd, status), where "av" indicates an attributes vector (e.g., knowledge required, test language required, etc.), "et" indicates an estimated time duration for testing this test case, "trigger" is the trigger type, "ev" indicates the environment required, "esd" (estimated defect) represents the estimated defect number of the test by leveraging best practices and/or an applicable reference project (as described above), and "status" is a vector, e.g., (start time, end time, tester/workload, defects revealed, and execution status), indicating the testing status of the test case. In this manner, implementations of the invention define a test dependency graph of test cases, where the test dependency may be further defined in terms of triggers (e.g., ODC triggers) such that testing can be optimized to resources. Although a particular exemplary test dependency graph methodology has been described, the invention is not intended to be limited by this methodology, and any suitable test dependency graph methodology may be used within the scope of the invention.

Table 1 illustrates an exemplary test case list in accordance with aspects of the invention. In embodiments, each test case group is represented by items under the Attributes Vector column, estimated time (ET) for the execution of the test cases column, the trigger for that test case group, the environment (EV) to execute the test case group, estimated defects (EST) for the group populated by TPOW, and the status information such as start time, end time, tester/workload, and in the last column, number of defects revealed.

TABLE 1

| Test Case | Attributes Vector (AV) | | | ET (PD) | Trigger | EV | EST | | Status | | |
|---|---|---|---|---|---|---|---|---|---|---|---|
| T1 | Java | English | ... | 3 | Coverage | Susie | 12 | 9.1 | 9.3 | Joe | 9 | ... |
| T2 | JSP | English | ... | 4 | Interaction | Win32 | 23 | 9.4 | 9.8 | Henry | 20 | ... |
| T3 | C++ | Chinese | ... | 2 | Sequence | Linux | 19 | 9.7 | 9.9 | Tim | 8 | ... |

Figure 6B:
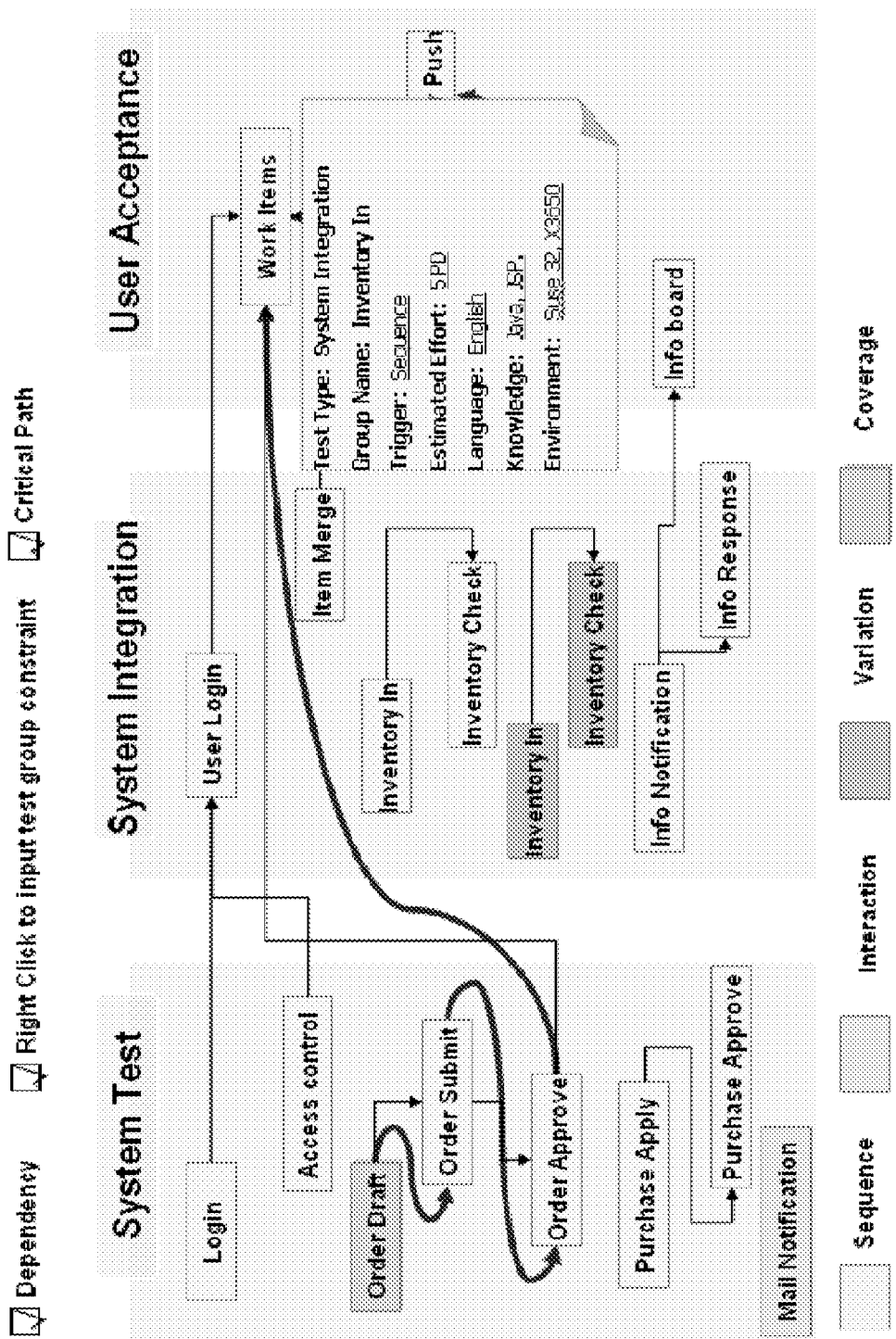
FIG. 6B illustrates an exemplary user interface and underlying functionality in accordance with aspects of the invention.

FIG. 6B shows an exemplary user interface (UI) 609 representing underlying functionality of the TPOW 50 in accordance with aspects of the invention. The UI 609, and all other user interfaces described herein, are merely exemplary and are provided for illustrating aspects of the TPOW 50 in accordance with aspects of the invention. The user interfaces described herein are not intended to limit the scope of the invention, and it is understood that other different interfaces may be used in implementations of the invention. The user interfaces described herein may be presented to a user with any suitable I/O device (e.g., I/O device 28 of FIG. 1).

More specifically, the UI 609 may provide a user with the functionality to manually annotate test constraints and test dependencies, as described with respect to FIG. 5. In UI 609, the boxes 610a, 610b, ..., 610n represent individual test cases and the arrows 615 between boxes represent dependencies between test cases. When a user selects (e.g., clicks on) one of the boxes representing a test case, the user is provided with an editable area in which the user may manually annotate information regarding the selected test case. For example, the user may manually annotate information such as, but not limited to at least one of: a trigger that the test case is associated with; an estimated effort, e.g., in person days (PD) for the test case; a language required to perform the test case; knowledge require to perform the test case; and an environment associated with the test case. In embodiments, this information may be used by the test model module 30 when generating a test dependency graph and critical path.

In accordance with aspects of the invention, the UI 609 may indicate which elements are included in the critical path 630. In accordance with further aspects of the invention, the UI 609 may display the test cases 610a, 610b, ..., 610n arranged according to ODC activities 640 (e.g., via spatial location) and triggers 650 (e.g., via display color).

step 420, previously described with respect to FIG. 4, in which resource information is input and/or annotated. At step 710, the user manually inputs an identity of one or more testers (e.g., resource, person for performing a test, etc.) and may additionally define attributes (e.g., daily rate, knowledge, language(s), DDE by trigger, available time, etc.) associated with each tester. At step 720, the user manually inputs information to define test environment pool information, including, but not limited to available CPU time, machines, memory, etc.

In accordance with aspects of the invention the data structure "Tester" is the set available testers, each tester "tr" is a triple, e.g., tr=(tv, dde, dr), where "tv" indicates an attributes vector of the tester (e.g., knowledge, language, etc.), "dde" indicates the defect discovery efficiency by trigger, and "dr" represents the daily rate of the tester. Table 2 illustrates an exemplary "Tester" data structure in accordance with aspects of the invention. In embodiments, a "Tester" may be denoted by three kinds of items, e.g., the attribute vector (tv), defect discovery efficiency by trigger (dde), and daily rate (dr). In accordance with aspects of the invention, the test attribute vector (tv) is used in determining whether the knowledge of the tester is sufficient to run a particular test case. In further embodiments, the dde value by trigger (also referred to herein as DDE) is used in determining whether the tester is efficient enough to be able to run test cases with more sophisticated triggers. In additional embodiments, the daily rate—the costs of labor—of the tester (dr) is used in selecting resources to execute test cases requiring any special triggers, whereby the qualified candidates with the lowest daily rate by high DDE would be selected. It is noted that the invention is not intended to be limited to these exemplary data structures, and that any suitable data structures and test dependency graph methodology may be used within the scope of the invention.

TABLE 2

| Tester | Tester Attribute Vector (TV) | | | | DDE/ Coverage | DDE/ Interaction | DDE/ Sequence | DDE/ ... | Daily Rate |
|---|---|---|---|---|---|---|---|---|---|
| John | Java | English | ... | 3 | 12 | 0 | 34 | ... | 14 |
| Tim | JSP | English | ... | 4 | 10 | 23 | 23 | ... | 34 |
| Kelly | C++ | Chinese | ... | 2 | 2 | 12 | 13 | ... | 12 |

Still referring to FIG. 6B, in embodiments, the UI 609 includes a check boxes 660, 670, and 680 that, when selected, permit a user to annotate the test dependency graph. For example, by checking the "Dependency" box 660, a user may manually edit a line (e.g., via mouse command) to annotate a dependency between test groups. Moreover, by checking the "Right Click to input the test group constraint" box 670, a user may manually input constraints of a selected test group. Additionally, by checking the "Critical Path" box 680, the user can turn on and off the display of the critical path line 630.

Figure 7:
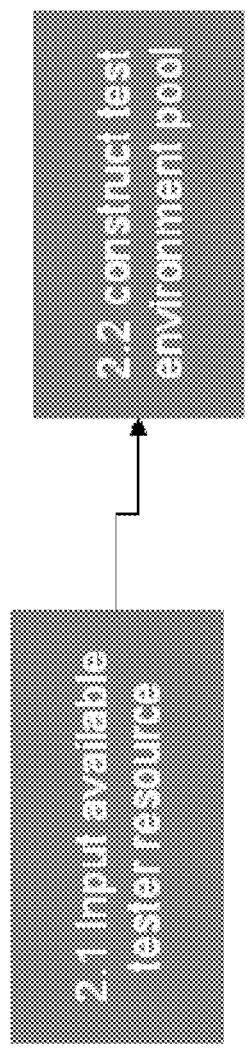
FIG. 7 depicts a flow diagram illustrating an exemplary process in accordance with aspects of the invention.

FIG. 7 shows a flow diagram 700 depicting steps of a process in accordance with aspects of the invention. The steps of the flow diagram 700 may be performed in association with Moreover, the data structure "EV" may be a set of test environments (e.g., a pool), and in which the available test environment resource decreases as test execution occupies test resources and increases as test resources are released after the test execution. Additionally, each "ev" is a vector indicating all the possible environment resources. It is noted that the invention is not intended to be limited to these exemplary data structures, and that any suitable data structures and test dependency graph methodology may be used within the scope of the invention.

FIG. 8 shows an exemplary user interface (UI) 800 representing underlying functionality of the TPOW 50 in accordance with aspects of the invention. For example, the UI 800 may be used to input and/or annotate resource information as described with respect to FIG. 7. More specifically, the UI 800 includes an organizational tab 810 via which a user can manually define parameters of the organization (e.g., test team) such as, for example, average daily billing rate 820, number of staff members 830, and competencies 840. The UI 800 may also include a tester tab 820 which allows a user to manually enter attributes associated with individual testers.

Figure 9:
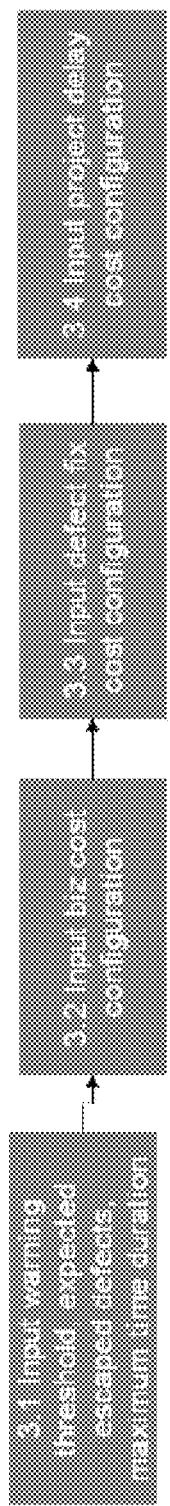
FIG. 9 depicts a flow diagram illustrating an exemplary process in accordance with aspects of the invention.

FIG. 9 shows a flow diagram 900 depicting steps of a process in accordance with aspects of the invention. The steps of the flow diagram 900 may be performed in association with step 430, previously described with respect to FIG. 4, in which data for defining and constructing an optimized total cost model is input to the TPOW 50.

At step 910, the user manually inputs data defining one or more project delay warning thresholds, expected escape defects, and maximum time duration. This manual input of data, and all other manual inputs of data described herein, may be performed by a user via a user interface implemented n I/O device 28 described above with respect to FIG. 1.

In embodiments, the TPOW 50 uses project delay warning thresholds data to determine, based on the most recent scheduling estimate, whether a project is approaching an unacceptable delay (e.g., as defined by the user). In embodiments, when a determined project schedule delay exceeds a user-defined project delay warning threshold, the TPOW 50 sends a warning to the user from TPOW indicating an action should be taken to place the project back on schedule. In embodiments, the warning may be sent by email and/or by pop-up message on a user interface, e.g., when a project manager logs in to TPOW; however, the invention is not limited to these types of warnings, and any suitable warnings may be used within the scope of the invention.

In accordance with aspects of the invention, a value for expected escape defects (EED) is also manually entered at step 910 and indicates a user-defined quality of the software under test, expressed as number of defects found in production (e.g., field defects). For example, a relatively low value of escaped defects indicates a relatively high quality, and vice versa; however, higher quality code implies that more resources will be invested on testing.

In accordance with further aspects of the invention, a maximum time duration (MTD) is also manually input at step 910. In embodiments, the MTD (also referred to as maximum total duration) represents the maximum acceptable duration for the project. In accordance with aspects of the invention, the EED and MTD are used as constraints when determining the optimized total cost model 435 described with respect to FIG. 4.

At step 920, the user manually inputs business cost data, which may include, but is not limited to, the business cost per escaped defect, defect severity levels, etc. Additionally or alternatively, this business cost data may be extracted from data that was entered and saved when a micro plan for this project was previously created. This business cost data, along with the number of escaped defects, may be used by the cost module 35 to generate a business cost (BC).

In accordance with aspects of the invention, the business cost (BC) is calculated by multiplying the defect number escaped to production and business cost per defect. For example, business cost per defect can be modeled by cost types and defect severity levels. In embodiments, business cost per defect is further weighted by the risk level of the business requirements with which the defect is associated. In embodiments, the TPOW 50 may be set with default cost weights by risk levels, such as, for example, high risk weight equals 2.0, medium risk weight equals 1.0, and low risk weight equals 0.5; however, the invention is not limited to these values of weighting, and other values may be used within the scope of the invention. In additional embodiments, a user may manually configure the weight of each risk level.

At step 930, the user manually inputs defect-fix cost data. In embodiments, the defect-fix cost data represents a cost to fix each defect per lifecycle activity. The defect-fix cost data, along with an estimated defect distribution per activity (e.g., generated in macro planning) may be used by the cost module 35 to determine a defect diagnosis and fix cost (DDFC) for the project.

In accordance with aspects of the intention, the defect diagnosis and fix cost (DDFC) is calculated by multiplying the number of defects uncovered at each lifecycle activity (e.g., including production) and cost per defect (e.g., a variable that may be defined by the user as different for different activities). In embodiments, two kinds of DDFC (e.g., defect resolution cost) are differentiated: a first for valid defects, and a second for invalid defects. For example, invalid defects typically involve some diagnosis time but do not incur fix and/or resolution time, as opposed to valid defects which involve time for fixing and/or resolving the defect. In embodiments, a default percentage of 35% is used to calculate an invalid defect cost; however, the invention is not limited to this default value, and other values may be used within the scope of the invention. Moreover, a user can manually adjust this value.

At step 940, a user manually inputs one or more rules that define costs per delay in the test schedule. For example, an exemplary, non-limiting rule may define that there is a cost of $1000 per day that the project is delayed. Based on the rules that define costs per delay and a generated schedule, the cost module 35 determines a project delay cost, which may be part of the optimized total cost model 435. It is noted that the invention is not intended to be limited to this exemplary cost per delay rule, and that other rules may be used within the scope of the invention.

In additional embodiments, the TPOW 50 includes predefined and stored set of defect fix cost rules, business cost rules, and delay cost rules organized by industry, application type, etc. In embodiments, the rules are based on empirical data built from historical projects and may represent, for example, suggested best practices. In embodiments, users may choose to use one or more of the pre-defined rules in at least one of steps 920, 930, and 940. Additionally, a user may modify one or more existing pre-defined rules and/or create one or more new rules in any of steps 920, 930, and 940. In embodiments, any such modified rules and created rules are saved in the TPOW 50 future use.

In accordance with aspects of the invention a tester cost (TRC) is calculated by the cost module 35 by the sum of multiplying the daily rate of the tester and the duration of scheduled testers, following the equation (TRC=sum of tester.rate*tester.td). In other words, TRC may represent the cost the project is spending on the testers.

In accordance with further aspects of the invention, the cost module 35 determines a total cost (TC) as TC=TRC+PDC+BC+DDFC, where TRC is decided by the testers scheduled in the testing process, PDC (Person Day Cost) increases as the test process delays, BC has a linear relationship with EED (expected escape defects), and DDFC has linear relationship with EED.

In embodiments, the cost module 35 determines the optimized total cost model 435, described with respect to FIG. 4, by determining a minimum total cost (TC) in view of the maximum time duration (MTD) and expected escape defects (EED) constraints. The cost module 35 may be programmed with parameter estimation logic, which is known such that further explanation is not believed necessary, in order to determine the minimum TC in view of the applicable constraints. It is noted that the invention is not intended to be limited by the exemplary costs, constraints, and cost model described herein, and that any suitable costs, constraints, and cost model may be used within the scope of the invention.

Figure 10:
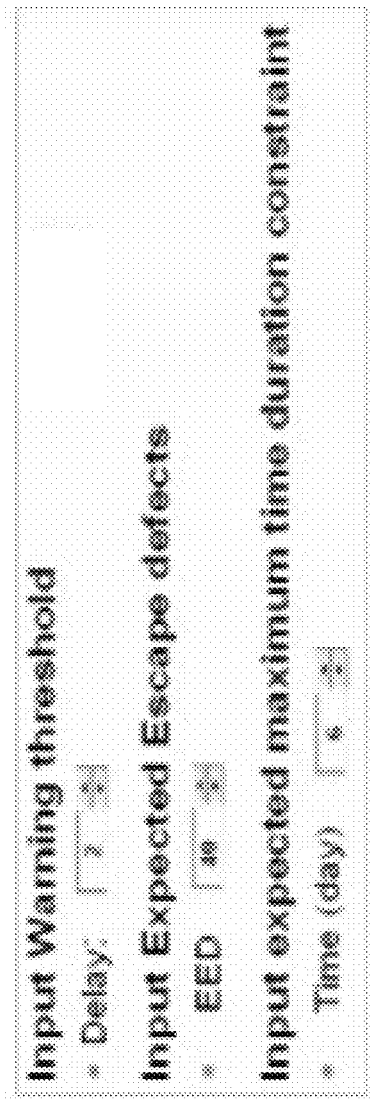

FIG. 10 shows an exemplary user interface (UI) 1000 representing underlying functionality of the TPOW 50 in accordance with aspects of the invention. For example, the UI 1000 may be employed by a user to manually input values for project delay warning threshold 1010, a value for expected escape defects (EED) 1020, and a value for maximum time duration (MTD) 1030.

FIG. 11 shows exemplary user interfaces (UI) 1100 and 1150 representing underlying functionality of the TPOW 50 in accordance with aspects of the invention. For example, the UI 1100 may be employed by a user to manually input values associated with business cost per defect 1110 and defect severity 1120. Additionally, UI 1150 shows the calculated business costs per risk level 1160 and a total business cost 1170 for the project.

Figure 12:
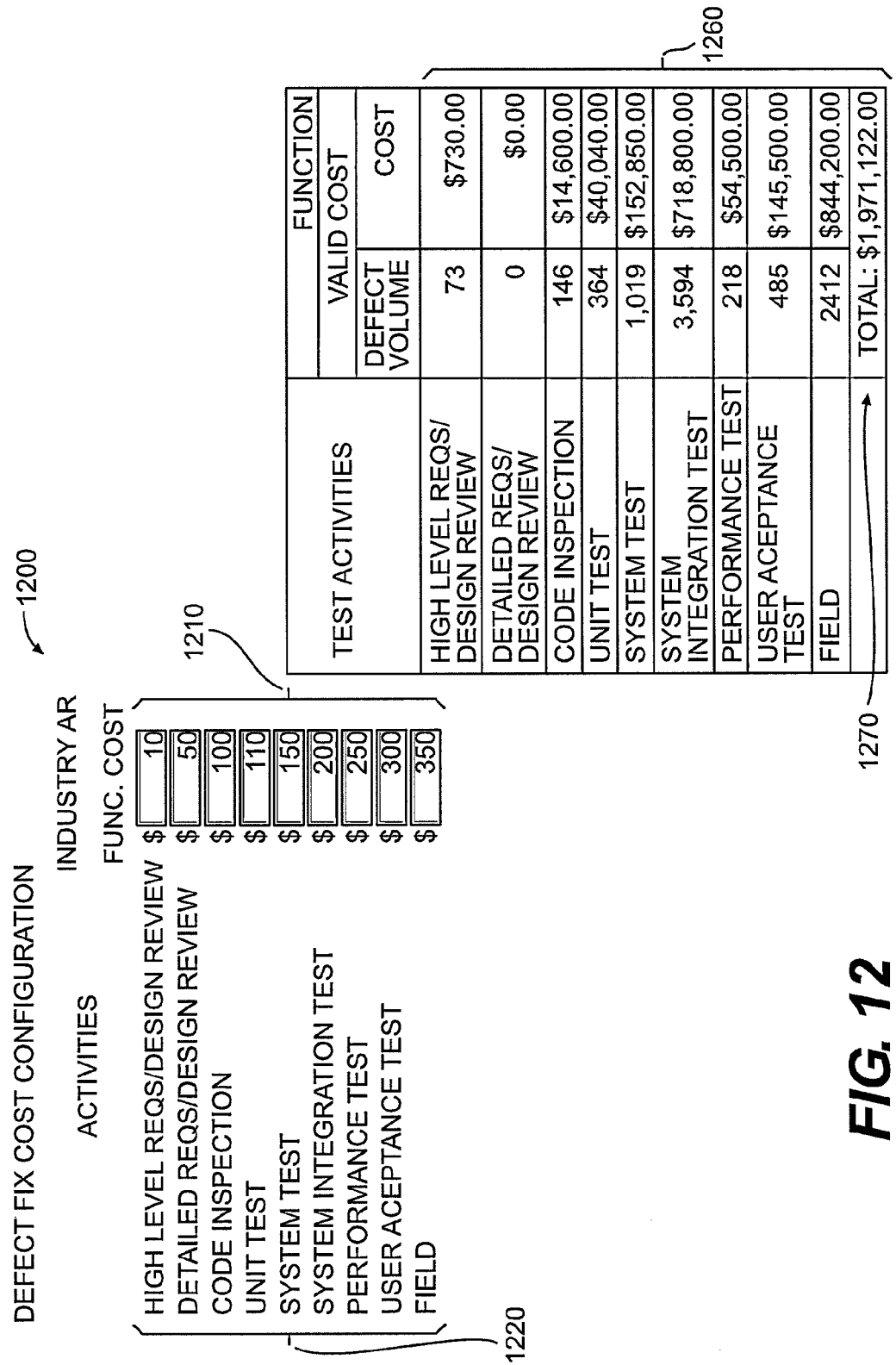

FIG. 12 shows exemplary user interfaces (UI) 1200 and 1250 representing underlying functionality of the TPOW 50 in accordance with aspects of the invention. For example, the UI 1200 may be employed by a user to manually input values associated with defect fix cost 1210 per activity 1220. Additionally, UI 1250 shows the calculated defect fix cost per activity 1260 and a total defect fix cost 1270 for the project.

Figure 13:
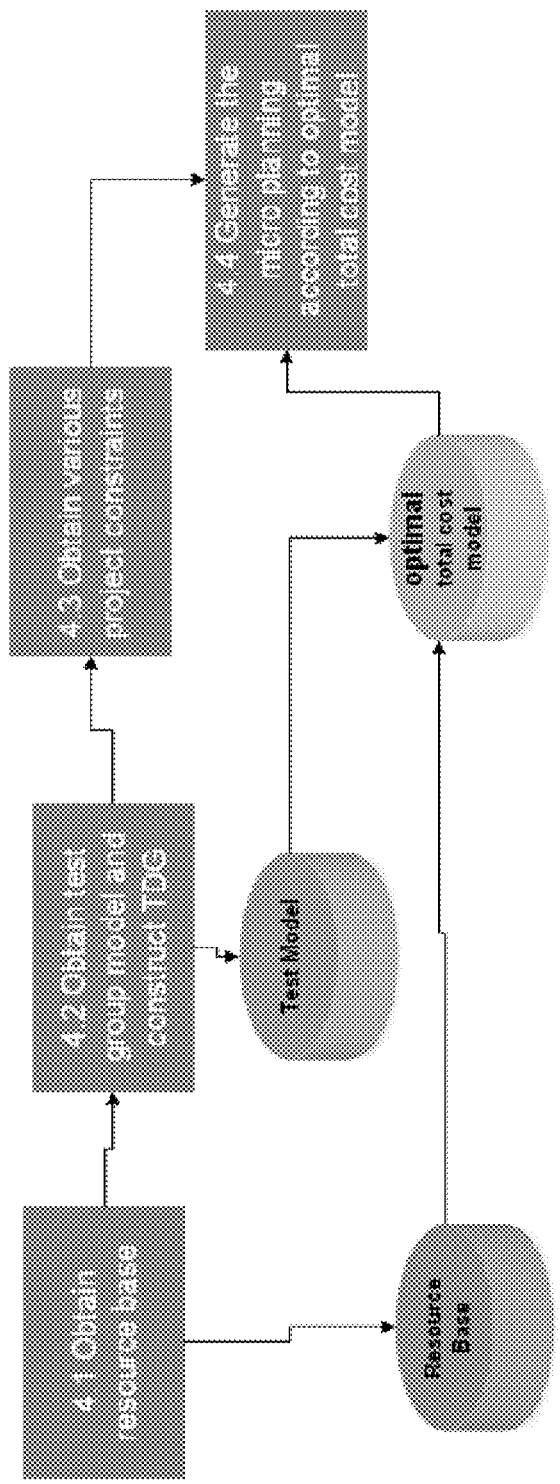
FIG. 13 depicts a flow diagram illustrating an exemplary process in accordance with aspects of the invention.

FIG. 13 shows a flow diagram 1300 depicting steps of a process in accordance with aspects of the invention. The steps of the flow diagram 1300 may be performed in association with step 440, previously described with respect to FIG. 4, in which the resource modeling and simulation module 40 generates a resource model and simulation based on the test model 415, resource base 425, and the optimized total cost model 435.

At step 1310, the resource modeling and simulation module 40 automatically obtains information associated with the resource base 425, which information will be used as input into the optimal total cost model. In embodiments, the information includes tester information and test environment pool information, as described with respect to FIGS. 7 and 8. In embodiments, this is performed by accessing the resource base 425 stored in storage 22B.

At step 1320, the resource modeling and simulation module 40 automatically obtains information associated with the test model 415, which information will be used as input into the total cost model. In embodiments, the information includes the test dependency graph and critical path, as described with respect to FIGS. 5 and 6. In embodiments, this is performed by accessing the test model 415 stored in storage 22B.

At step 1330, the resource modeling and simulation module 40 automatically obtains information associated with the optimized total cost model 435, such as project constraints and cost rules. In embodiments, the information includes: the project delay warning threshold, expected escape defects (EED), maximum total duration (MTD), business cost rules, project delay cost rules, and defect diagnosis and fix cost (DDFC) rules, as described with respect to FIGS. 9-12. In embodiments, this is performed by accessing the optimized total cost model 435 stored in storage 22B.

At step 1340, the resource modeling and simulation module 40 generates micro planning for the project according to the optimized total cost model 435 and the data from steps 1310, 1320, and 1330. In embodiments, the generating the micro planning includes generating an optimized resource model (e.g., resource allocation plan) for the test project. In accordance with aspects of the invention, the resource modeling and simulation module 40 may be programmed with parameter estimation logic, dependency graph and modeling logic, and scheduling logic, all of which are known such that further explanation is not believed necessary. In this manner, the resource modeling and simulation module 40 operates to generate a resource model (e.g., resource allocation plan) that: allocates resource defined in the resource base 425 to the test cases; minimizes the total cost base on the optimized total cost model 435; conforms to the test dependencies defined in the test dependency graph of the test model 415, and satisfies the constraints (e.g., escape defects and maximum total duration) defined in the optimized total cost model 435. Once generated, the resource model may be visualized, e.g., displayed to a user in various formats via an I/O device 28.

Figure 14:
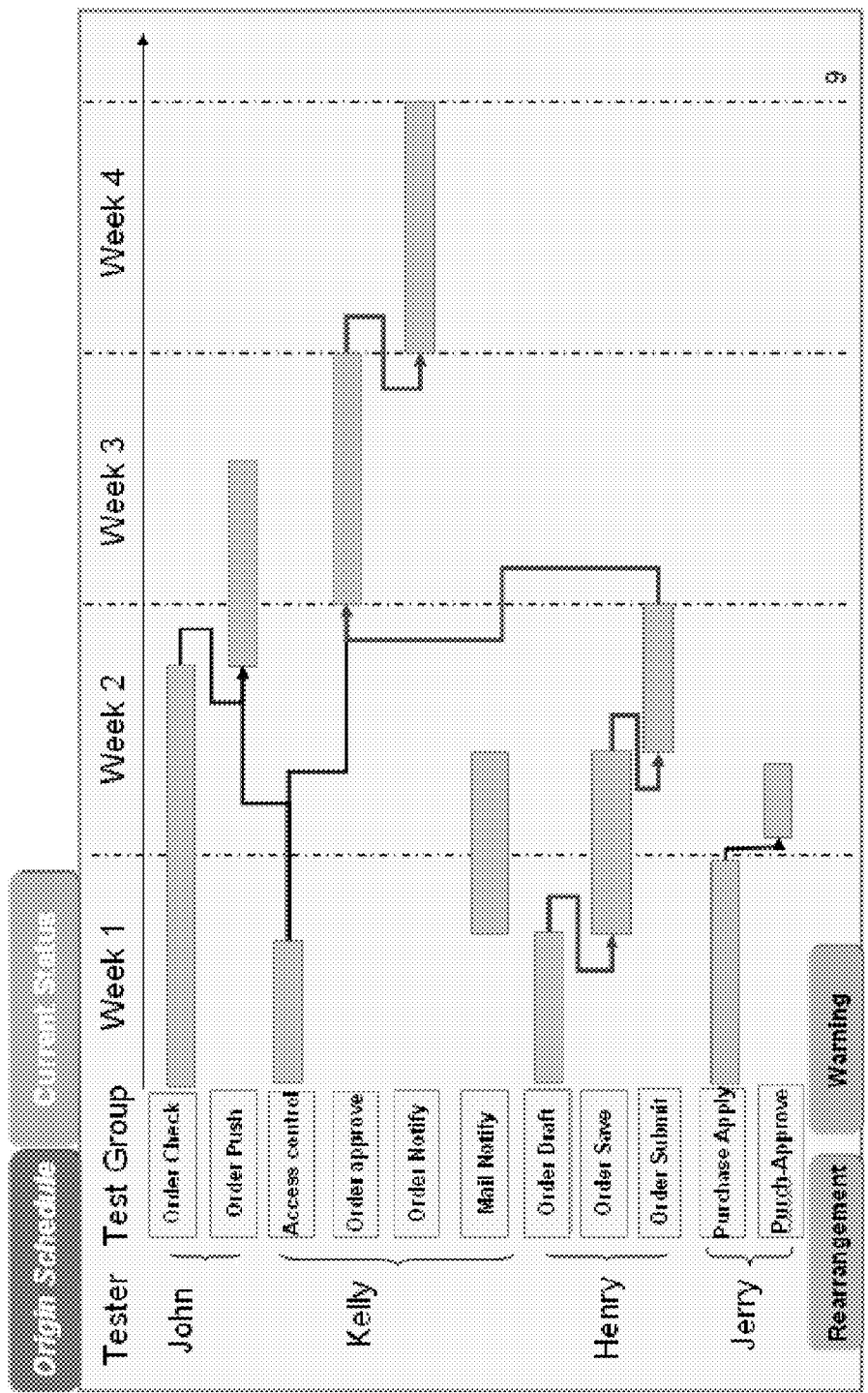
FIGS. 14 and 15 illustrate exemplary user interfaces and underlying functionality in accordance with aspects of the invention.

FIG. 14 shows an exemplary user interface (UI) 1400 representing underlying functionality of the TPOW 50 in accordance with aspects of the invention. More specifically, UI 1400 illustrates en exemplary schedule generated based on the resource modeling and simulation performed in accordance with aspects of the invention. For example, test cases 1410a, 1410b, . . . , 1410n are allocated to specific testers 1420. Moreover, the duration of each test case 1410a, 1410b, . . . , 1410n is indicated by the horizontal length of the test bar associated with the particular test case. Additionally, test dependencies 1430 are depicted between certain test cases, indicating which must be performed before another can begin.

Figure 15:
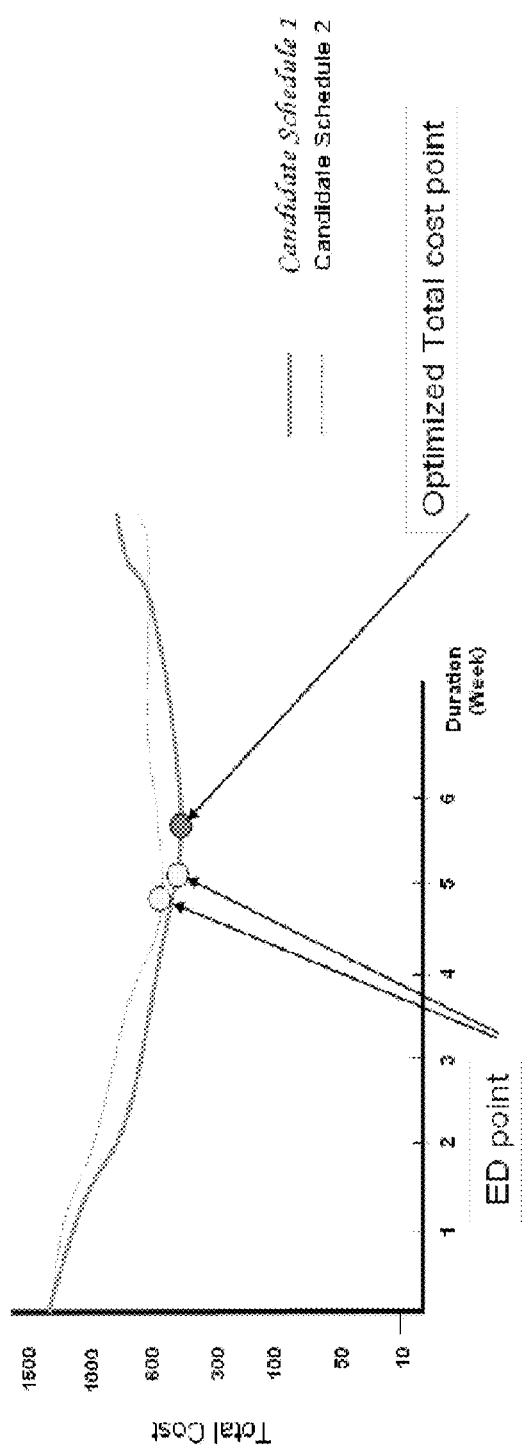

FIG. 15 shows an exemplary user interface (UI) 1500 representing underlying functionality of the TPOW 50 in accordance with aspects of the invention. More specifically, UI 1500 depicts two alternate schedules of two different resource plans that each satisfy the resource modeling criteria (e.g., uses resource defined in the resource base 425, minimizes the total cost base on the optimized total cost model 435, conforms to the test dependencies defined in the test dependency graph of the test model 415, and conforms to the constraints defined in the optimized total cost model 435). In accordance with aspects of the invention and in accordance with parameter estimation techniques in general, it is possible to generate more than one resource model that satisfies the defined resource modeling criteria for a given project.

For example, as shown in FIG. 15, the TPOW 50 may display a first cost-versus-time curve 1510 for a first plan and a second cost-versus-time curve 1520 for a second plan that are both generated by the resource modeling and simulation module 40 for a given project. A user may utilize such a display to compare plural viable resource plans and select a desired one to implement. For example, a user might select the first plan 1510 because it has a lowest optimized cost point.

In accordance with aspects of the invention, and as depicted in the UI 1500, the "ED point" indicates the moment that estimated escaped defects are less than the EED entered by the user. Moreover, in embodiments, the "Optimized Total Cost point" represents the moment that the total cost reaches the lower boundary, which illustrates that the cost associated with a tester will increase as time moves on, and the costs increase more quickly than the other costs could be reduced. In accordance with further aspects of the invention, and as depicted in the UI 1500, the total cost goes down as the test progresses because the BC and DDFC decrease as EED decreases. Although the TRC increases as test progresses, the TRC increases more slowly than BC, and DDFC decreases before the ED point (e.g., the point at which the escaped defects constraint is satisfied). The TC line decreases until TRC increases more quickly than BC and DDFC decreases.

This may result, for example, in more than one resource model that satisfies the user-defined criteria for the test project.

Figure 16A:
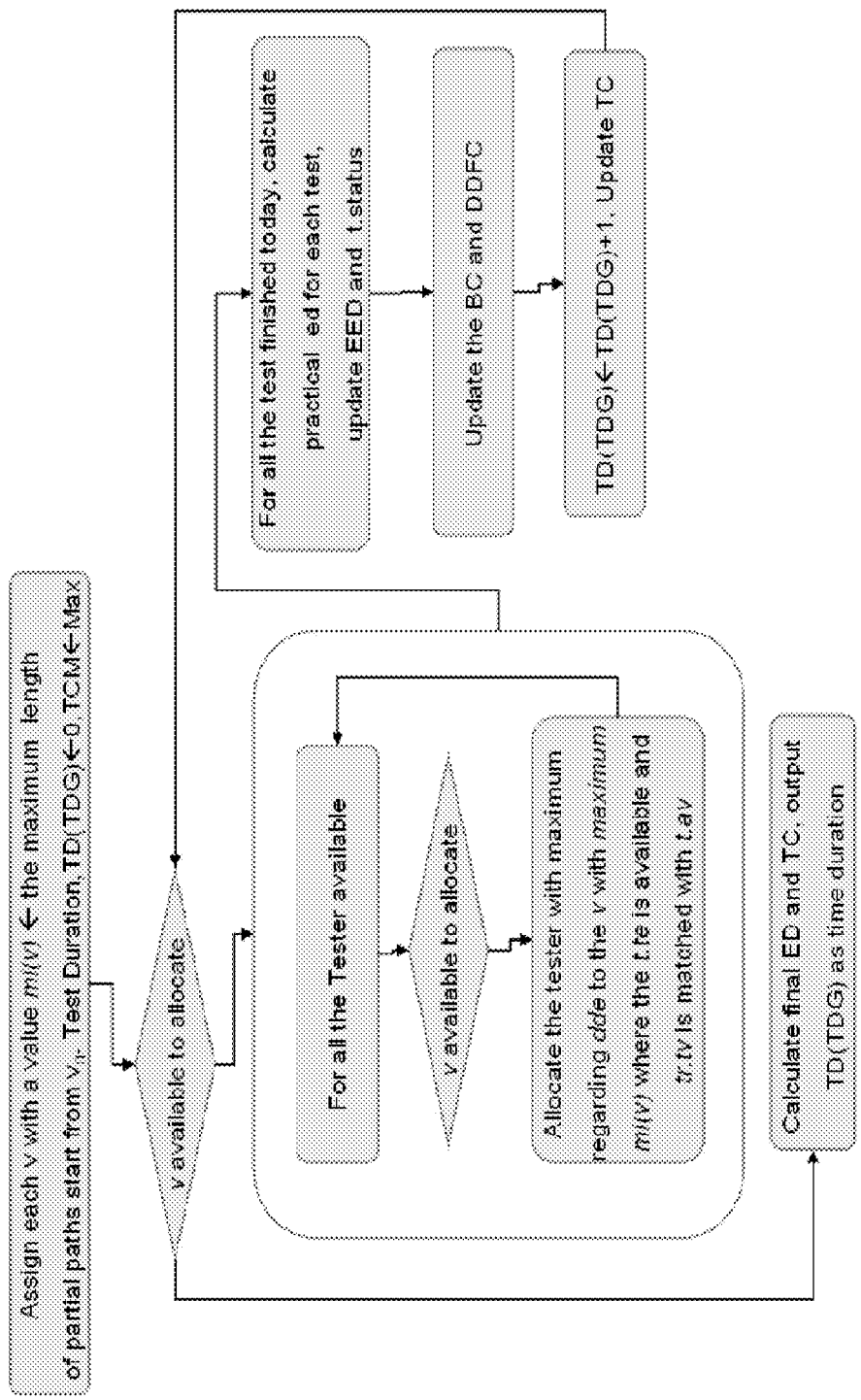
FIG. 16A depicts a flow diagram illustrating an exemplary process in accordance with aspects of the invention.

FIG. 16A shows a flow diagram 1600 depicting steps of a process in accordance with aspects of the invention. The steps of the flow diagram 1600 may be performed in association with step 440 described with respect to FIG. 4 and, more particularly, in association with step 1340 described with respect to FIG. 13. The flowchart in FIG. 16A illustrates an exemplary algorithm used in the total cost calculation, and the logic of the flowchart may be programmed into the resource modeling and simulation module 40. In accordance with aspects of the invention, the relationship between variable TC and function TD (e.g., TDG) in the algorithm illustrates the total cost as the time duration increases.

More specifically, at step 1610, each data structure "v", which represents a set of test cases (as described with respect to FIGS. 5 and 6A), is assigned values related to start node and test duration (TD). At step 1615, the system determines whether there are any data structures "v" that are available to allocate. If there is at least one data structure "v" available for allocation, then the process proceeds to steps 1620, 1630, and 1640 which represent an iterative loop for allocating the "Tester" data structure with the maximum defined DDE to the data structure "v" with the maximum length. At step 1650, the practical "ed" for each test is calculated and the EED and "t.status" are updated. At step 1660, the BC and DDFC are updated. At step 1670, the TC is updated. When there is no remaining data structure "v" to allocate at step 1615, the process proceeds to step 1680 in which the final ED and TC are calculated and the TD is out put. It is noted that the algorithm depicted in FIG. 16A is exemplary and is not intended to limit the invention; instead, any suitable logic may be used in performing the total cost calculation in accordance with aspects of the invention.

Figure 16B:
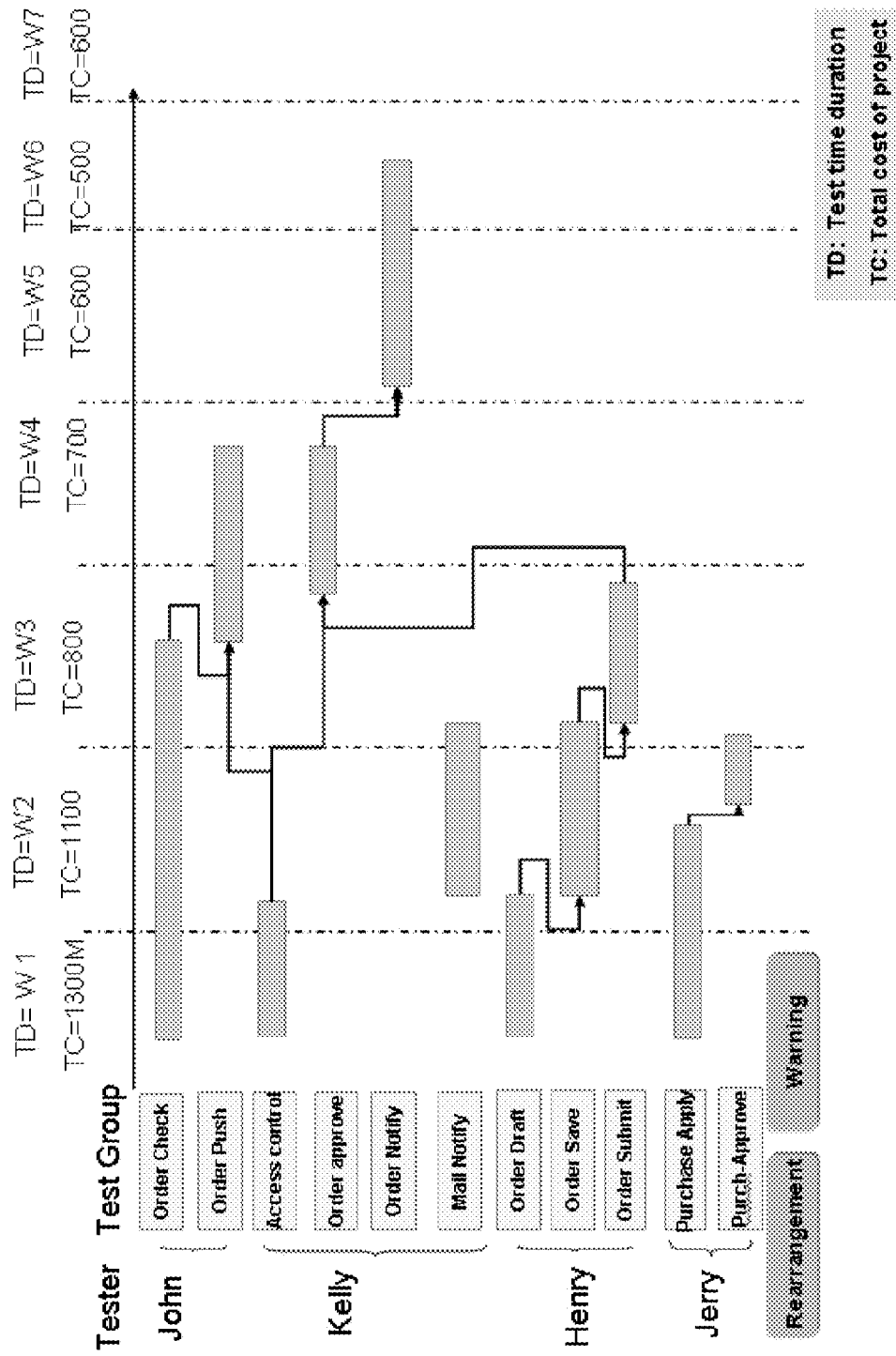
FIG. 16B illustrates an exemplary user interface and underlying functionality in accordance with aspects of the invention.

FIG. 16B illustrates an exemplary resource simulation 1690, TC 1692, and TD 1694 that are populated during execution of the algorithm described with respect to FIG. 16A. For example, the total cost (TC) may reveal how defects not detected in testing cause a financial loss to a business. Moreover, as the testing progress moves on and some defects are revealed, the business loss decreases until the sixth week. After that, no matter how many testers are hired for testing, it is hard to reveal more defects. Thus, the total cost starts to increase as the cost of these testers increases. The exemplary resource simulation 1690, TC 1692, and TD 1694 depicted in FIG. 16B are provided for illustrative purposes only, and are not intended to limit the scope of the present invention. Other resource simulation, TC, and TD may be used within the scope of the invention.

Figure 17:
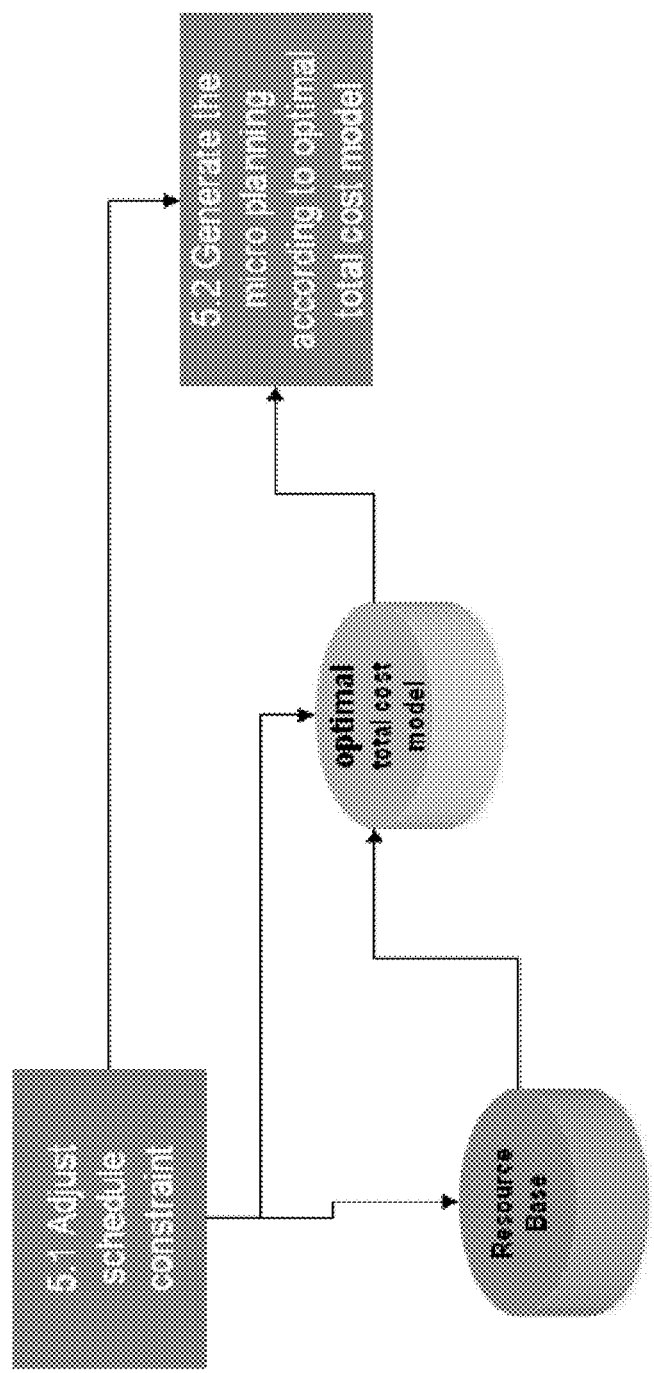
FIG. 17 depicts a flow diagram illustrating an exemplary process in accordance with aspects of the invention.

FIG. 17 shows a flow diagram 1700 depicting steps of a process in accordance with aspects of the invention. The steps of the flow diagram 1700 may be performed in association with step 450, described with respect to FIG. 4, in which at least one schedule constraint is adjusted for expected resource modeling.

At step 1710, a user manually adjusts one of the constraints, such as expected escape defects (EED), maximum total duration (MTD), and delay warning threshold. For example, a user may adjust one or more constraints to perform a 'what-if' type of alternatives analysis. Additionally or alternatively, a user might adjust a constraint when the project has progressed to a point in which the initially generated schedule is no longer satisfied in actuality.

At step 1720, the TPOW 50 re-generates (e.g., re-calculates) the project schedule according to the adjusted constraint and the remainder of the unchanged input data. In embodiments, the re-generation includes generating micro planning according to the optimal total cost model, similar to step 1340 described with respect to FIG. 13 but with at least one different constraint. In accordance with further aspects of the invention, when there is no solution that satisfies the new (e.g., adjusted) constraint configuration defined by the user, the TPOW 50 determines and provides a recommended constraints configuration will be provided to the user. The TPOW 50 may determine the recommended constraints configuration using parameter estimation techniques, the logic of which may be programmed in the TPOW 50.

In embodiments, the adjusted constraint may comprise the delay warning threshold (DWT), which indicates the maximum acceptable project delay duration. Once the project progress delays over DWT, the TPOW 50 sends a warning to the user as a reminder to take some action to get the project back on schedule. In additional embodiments, the adjusted constraint may comprise the maximum total duration (MTD), which is the expected maximum time duration of the project. That is to say, the resource modeling schedule is constrained from going beyond the MTD. In additional embodiments, the adjusted constraint may comprise the expected escape defects (EED), which is the expected minimum number of escaped defects. For example, this constraint may indicate the quality of the project, since a lower value of EED represents a higher the quality project.

Figure 18:
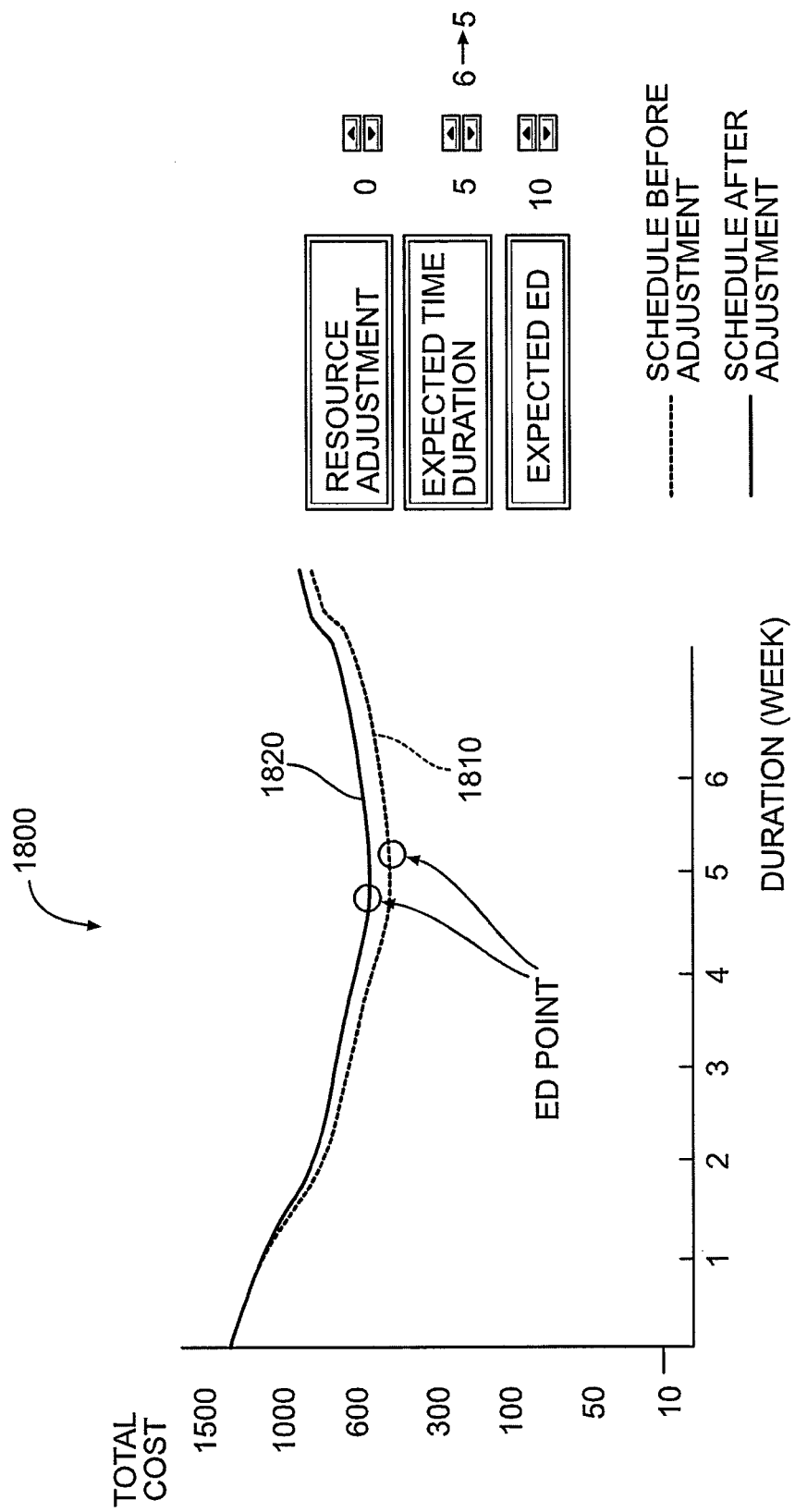
FIG. 18 illustrates an exemplary user interface and underlying functionality in accordance with aspects of the invention.

FIG. 18 shows an exemplary user interface (UI) 1800 representing underlying functionality of the TPOW 50 in accordance with aspects of the invention. For example, the UI 1800 shows a first cost-versus-duration curve 1810 associated with a first resource model generated by the TPOW 50 and a second cost-versus-duration curve 1820 associated with a second resource model generated by the TPOW 50. For example, the first curve 1810 may be associated with a first unadjusted resource model, and the second curve 1820 may be representative of a second resource model that was generated by the TPOW 50 after a user manually changed the MTD (e.g., from 6 weeks to 5 weeks). In this example, the manual adjustment of the MTD shortens the time to complete the project, which pulls another resource (e.g., tester) onto the project, which increase the total cost of the second project to more than that of the first project.

Figure 19:
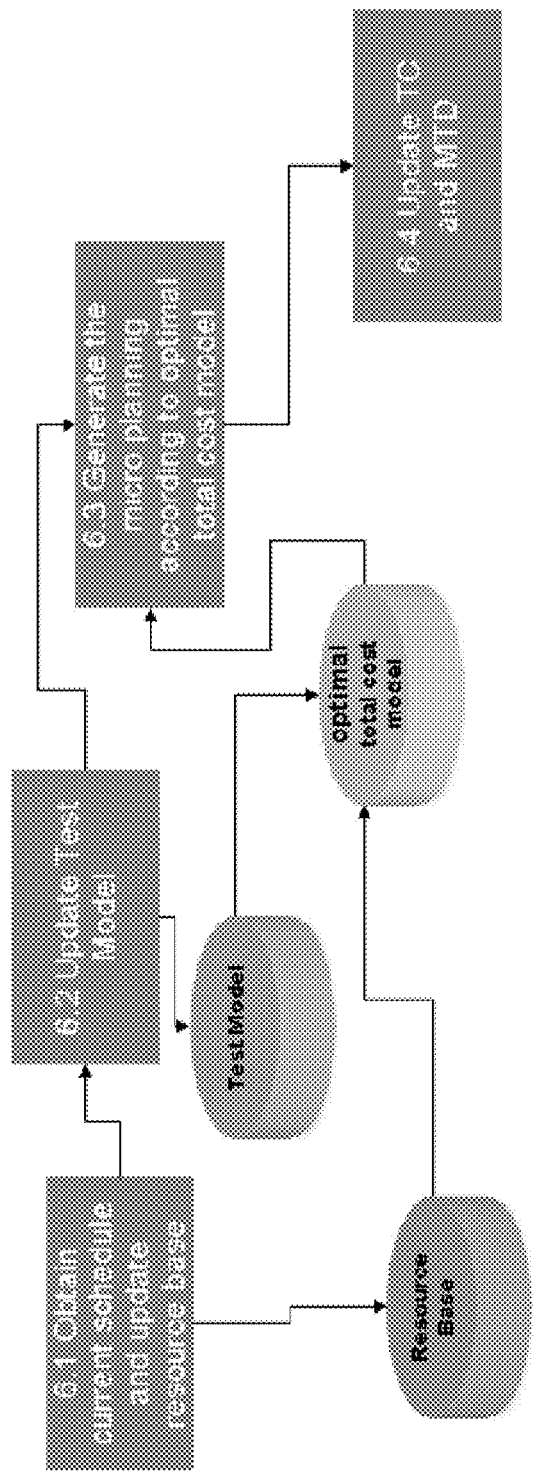
FIG. 19 depicts a flow diagram illustrating an exemplary process in accordance with aspects of the invention.

FIG. 19 shows a flow diagram 1900 depicting steps of a process in accordance with aspects of the invention. The steps of the flow diagram 1900 may be performed in association with step 460, described with respect to FIG. 4, in which the TPOW 50 sends a warning to a user when the project schedule exceeds an established threshold. In embodiments, when the project schedule becomes delayed beyond the user-defined delay warning threshold, a warning is automatically sent to the user. In embodiments, the warning is sent via at least one of email and pop-up reminder from the TPOW 50 indicating to the user that action should be taken to get the project back on schedule. In accordance with further aspects of the invention, an on-the-fly reschedule process is performed after the schedule delay warning is sent out and/or the user has made some resource adjustment.

At step 1910, the TPOW 50 automatically obtains the current schedule status by accessing stored data. In embodiments, the current schedule status may be used for updating the current resource base 425 where, for example, some test environments and testers may be occupied by ongoing test case execution, some testers and test environments may be released as test blocked or successful test execution, and some testers and test environment resources may be added to the resource base.

At step 1920, the TPOW 50 updates the current test model 415. In embodiments, the updating may include, for example, storing data indicating that some test cases are completed, some test cases are not finished, and some test cases may be blocked. In further embodiments, the TPOW 50 generates an updated TDG from the test model where the "status" vector of each test case in the TDG is updated.

At step 1930, the TPOW 50 generates an updates resource model based on the updated resource base and test model by leveraging the optimal total cost model 435. In embodiments, this is performed in the manner described in step 1340 described with respect to FIG. 13.

At step 1940, the TPOW 50 permits the user to manually adjust the MTD, which may be performed as described herein. Also in step 1940, the TPOW 50 updates the total cost (TC) based on the equation TC=TRC+PDC+BC+DDFC, described herein.

Figure 20:
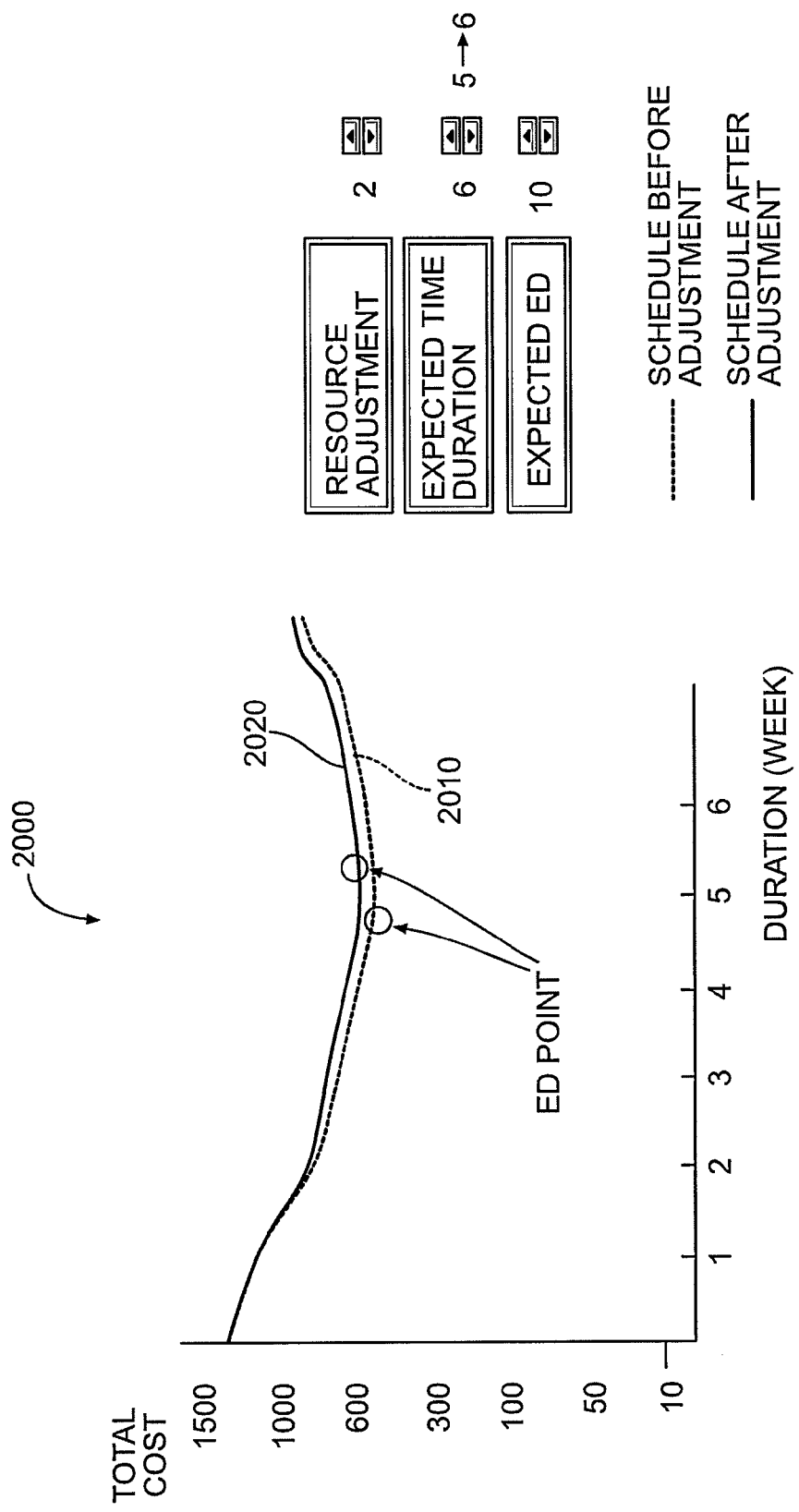
FIG. 20 illustrates an exemplary user interface and underlying functionality in accordance with aspects of the invention.

FIG. 20 shows an exemplary user interface (UI) 2000 representing underlying functionality of the TPOW 50 in accordance with aspects of the invention. For example, the UI 2000 shows a first cost-versus-duration curve 2010 associated with a first resource model generated by the TPOW 50 and a second cost-versus-duration curve 2020 associated with a second resource model generated by the TPOW 50. For example, the first curve 2010 may be associated with a first unadjusted resource model that caused a warning to be sent to the user when the schedule delay exceeded the threshold. The second curve 1820 may be representative of a second resource model that generated by the TPOW 50 after a user manually changed the MTD from 5 weeks to 6 weeks to accommodate the delay. In this example, the manual adjustment of the MTD affects the total cost of the second project. In embodiments, the cost-versus-duration curves may be based on total cost (TC) and scheduling data that is generated at step 440 of FIG. 4.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system comprising:
 a test planning optimization workbench including:
  a processor;
  a memory;
  a test modeling module, using the processor, operable to generate a test model from test cases and test case dependencies, wherein the test case dependencies are automatically derived from traceability between the test cases and use cases, the test cases are defined in a micro plan as tasks that are performed in association with a particular use case, and as such are linked to the particular use case, wherein the test modeling module is operable to determine a test estimate effort for each test case by leveraging knowledge of best practices and an applicable reference project using pre-defined rules, logic and probability tables, wherein the pre-defined rules, logic and probability tables are based on analysis and data-mining of historic data from past projects;
  a cost module, using the processor, operable to generate a cost model based on at least one constraint and at least one of defect-fix cost, business cost, and delay cost; and
  a resource modeling and simulation module, using the processor, operable to generate a resource plan based on a resource base, the test model, and the cost model, wherein the resource plan allocates resources defined in the resource base to the test cases, minimizes a total cost base on the cost model, conforms to the test case dependencies defined in the test model, and satisfies the at least one constraint defined in the cost model.

2. The system of claim 1, wherein the test planning optimization workbench dynamically updates the resource plan in response to an adjusting of the at least one constraint.

3. The system of claim 1, wherein the test planning optimization workbench generates an alert when a project delay exceeds a delay warning threshold.

4. The system of claim 1, wherein the test planning optimization workbench displays the generated resource plan.

5. The system of claim 1, wherein the test planning optimization workbench receives data for defining and constructing the cost model from a user.

6. The system of claim 5, wherein the received data for the defining and the constructing the cost model includes at least one of: one or more warning thresholds, expected escape defects, one or more business cost configurations, one or more project delay cost configurations, and one or more defect fix cost configurations.

7. The system of claim 6, wherein the resource modeling and simulation module sends a warning to a user when a project schedule exceeds the one or more warning thresholds.

8. The system of claim 7, wherein the warning is one of an email and a pop-up message prompting the user to take action to address the exceeded project schedule.

9. The system of claim 8, wherein the test planning optimization workbench receives a resource adjustment from the user and generates a new resource plan based on the received resource adjustment.

10. The system of claim 1, wherein the resource plan includes a micro plan which can be displayed with a simulator.

11. The system of claim 10, wherein the test modeling module is operable to identify triggers which each test case is associated with, and to associate the triggers with any test dependencies related to each test case.

* * * * *